US012587334B2

(12) United States Patent
Zhang et al.

(10) Patent No.: US 12,587,334 B2
(45) Date of Patent: Mar. 24, 2026

(54) CONFIGURATION OF REFERENCE SIGNALS IN WIRELESS COMMUNICATION SYSTEMS

(71) Applicant: ZTE Corporation, Shenzhen (CN)

(72) Inventors: Shujuan Zhang, Shenzhen (CN); Bo Gao, Shenzhen (CN); Ke Yao, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 271 days.

(21) Appl. No.: 18/530,171

(22) Filed: Dec. 5, 2023

(65) Prior Publication Data

US 2024/0250787 A1     Jul. 25, 2024

Related U.S. Application Data

(63) Continuation of application No. PCT/CN2022/109215, filed on Jul. 29, 2022.

(51) Int. Cl.
H04L 5/00 (2006.01)
H04L 27/26 (2006.01)

(52) U.S. Cl.
CPC ...... H04L 5/0048 (2013.01); H04L 27/26035 (2021.01)

(58) Field of Classification Search
CPC ................. H04J 13/0074; H04J 11/005; H04J 13/0062; H04J 11/0056; H04J 2011/0006;
(Continued)

(56) References Cited

U.S. PATENT DOCUMENTS 9,686,110 B2 *   6/2017   Park ..................... H04L 27/2613
11,196,523 B2   12/2021   Liu et al.
(Continued)

FOREIGN PATENT DOCUMENTS

WO        2021046948 A1     3/2021

OTHER PUBLICATIONS

European Search Report issued in EP Patent Application No. 22944066.4, dated Feb. 4, 2025, 8 pages.
(Continued)

*Primary Examiner* — Congvan Tran
(74) *Attorney, Agent, or Firm* — Perkins Coie LLP

(57)        ABSTRACT

Methods, systems, and devices for designing and configuring reference signals in wireless communication systems are disclosed. An example method for wireless communication includes transmitting, by a wireless device to a network node, a sounding reference signal (SRS), where the SRS is determined by a first parameter and a cyclic shift parameter, and a value of the first parameter hops at a level of a first type of time unit and a value of the cyclic shift parameter hops at a level of a second type of time unit. Another example method for wireless communication includes receiving, by a wireless device from a network node, a configuration for an SRS resource, and transmitting an SRS in the SRS resource, where the configuration includes information associated with one or more time-domain orthogonal cover codes (TD-OCC) or a multiplexing type for multiple SRS ports in the SRS resource.

20 Claims, 5 Drawing Sheets

Transmitting, by a wireless device to a network node, a sounding reference signal (SRS)

102

(58) Field of Classification Search
CPC ............. H04L 27/26035; H04L 5/0048; H04L
27/2613
See application file for complete search history.

(56) References Cited

U.S. PATENT DOCUMENTS

| | | | |
|---|---|---|---|
| 12,439,403 B2 * | 10/2025 | Jiang ................. | H04W 72/1268 |
| 2014/0003262 A1 | 1/2014 | He et al. | |
| 2018/0083751 A1 * | 3/2018 | Seo ......................... | H04L 27/26 |
| 2021/0075577 A1 | 3/2021 | Zhang et al. | |
| 2022/0224444 A1 | 7/2022 | Go et al. | |
| 2023/0275737 A1 * | 8/2023 | Chen .................... | H04L 5/0048 |
| | | | 370/329 |
| 2024/0179038 A1 * | 5/2024 | Zhang ................ | H04J 13/0074 |

OTHER PUBLICATIONS

International Search Report in International Application No. PCT/CN2022/109215, mailed on Dec. 28, 2022, 9 pages.
Ericsson, "Configuration of SRS Carrier Switching," 3GPP TSG-RAN WG2 #110e, Tdoc R2-2005072, Electronic meeting, Jun. 1-12, 2020, 22 pages.

* cited by examiner

Transmitting, by a wireless device to a network node, a sounding reference signal (SRS) 102

Receiving, by a network node from a wireless device, a sounding reference signal (SRS) 202

Performing, based on the SRS, further communication with the wireless device 204

302

Transmitting, by a network node to a wireless device, a configuration for a sounding reference signal (SRS) resource

304

Receiving an SRS in the SRS resource

402

Receiving, by a wireless device from a network node, a configuration for a sounding reference signal (SRS) resource

404

Transmitting an SRS in the SRS resource

CONFIGURATION OF REFERENCE SIGNALS IN WIRELESS COMMUNICATION SYSTEMS

CROSS-REFERENCE TO RELATED APPLICATIONS

This application is a continuation of International Patent Application No. PCT/CN2022/109215, filed on Jul. 29, 2022, the contents of which are incorporated herein by reference in their entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability, and other emerging business needs.

SUMMARY

Techniques are disclosed for the design and configuration of reference signals (e.g., sounding reference signals (SRSs)) in wireless communication systems. An SRS in an SRS resource is determined by a first parameter (e.g., a group parameter or a sequence parameter) and a cyclic shift (CS) parameter, which are configured at the level of a first and/or second type of time units (e.g., one or more OFDM symbols). The described embodiments, amongst other benefits and advantages, reduce inter-cell interference.

In an example aspect, a method for wireless communication is disclosed. The method includes transmitting, by a wireless device to a network node, a sounding reference signal (SRS), wherein the sounding reference signal is determined by a first parameter and a cyclic shift parameter, wherein a value of the first parameter hops at a level of a first type of time unit and a value of the cyclic shift parameter hops at a level of a second type of time unit.

In another example aspect, a method for wireless communication is disclosed. The method includes receiving, by a network node from a wireless device, a sounding reference signal (SRS), and performing, based on the SRS, further communication with the wireless device, wherein the sounding reference signal is determined by a first parameter and a cyclic shift parameter, wherein a value of the first parameter hops at a level of a first type of time unit and a value of the cyclic shift parameter hops at a level of a second type of time unit.

In yet another example aspect, a method for wireless communication is disclosed. The method includes transmitting, by a network node to a wireless device, a configuration for a sounding reference signal (SRS) resource, receiving an SRS in the SRS resource, wherein the configuration comprises information associated with a time-domain orthogonal cover code (TD-OCC) or a multiplexing type for multiple SRS ports in the SRS resource.

In yet another example aspect, a method for wireless communication is disclosed. The method includes receiving, by a wireless device from a network node, a configuration for a sounding reference signal (SRS) resource, and transmitting an SRS in the SRS resource, wherein the configuration comprises information associated with one or more time-domain orthogonal cover codes (TD-OCC) or a multiplexing type for multiple SRS ports in the SRS resource.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figures 1, 2:
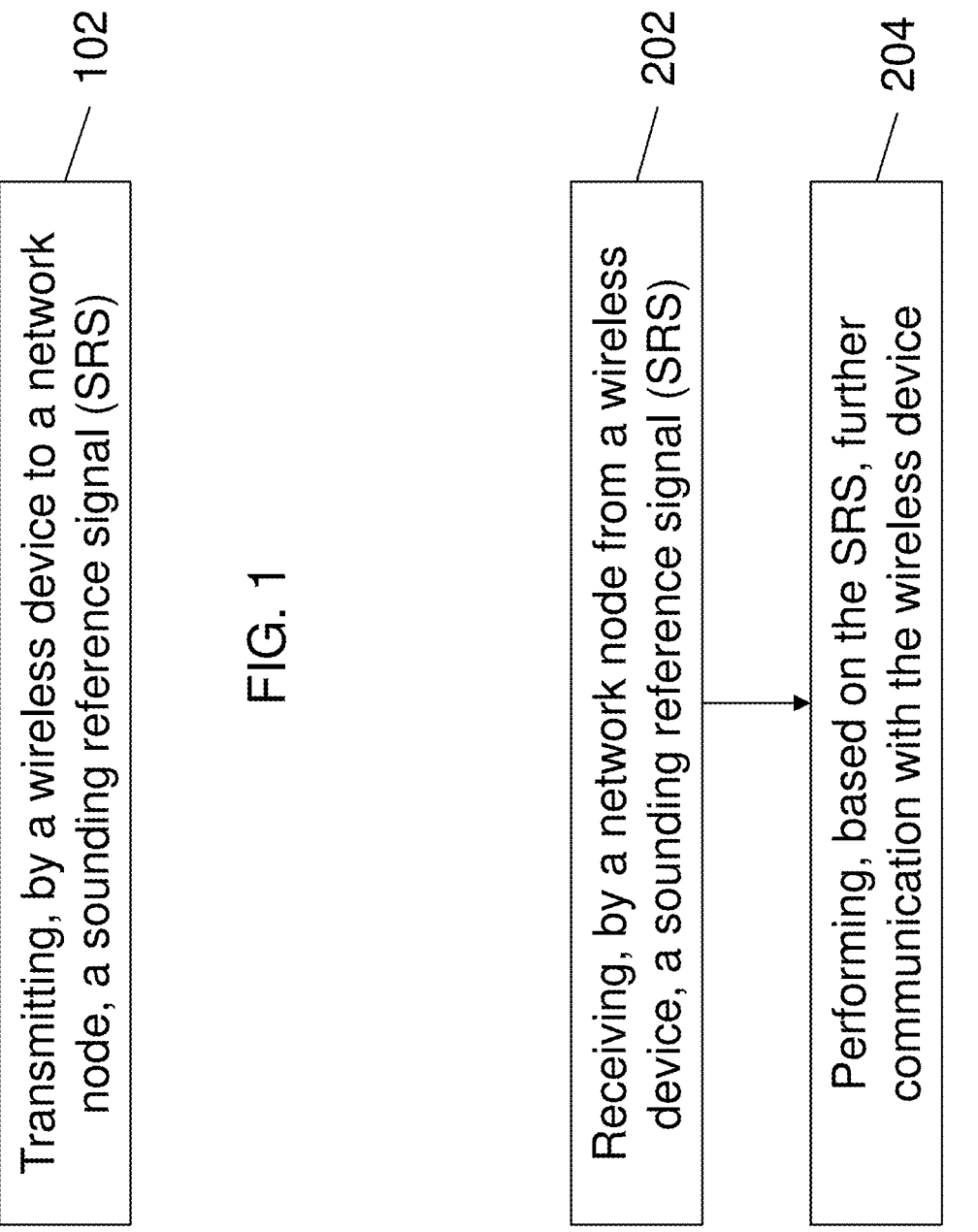
FIGS. 1-4 show example flowcharts for wireless communication.

In Fifth Generation (5G) New Radio (NR), time division duplexing (TDD)-based networking is emerging as the preferred implementation because the wide or ultra-wide spectrum requirement results in frequency division duplexing (FDD)-based networking as infeasible. In these systems, channel reciprocity is leveraged and thus, SRS design is essential for wireless channel estimation for both downlink (DL) and uplink (UL) transmissions.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

Example Embodiments with Cyclic Shift (CS) Hopping

In some embodiments, a wireless device (e.g., UE) may determine a group number u (or a sequence number v) and the cyclic shift (CS) of a sequence of a sounding reference signal (SRS). The UE then transmits the SRS, wherein the group number u and cyclic shift simultaneously changes when the time-domain unit changes, i.e., both the group number u and the cyclic shift are determined based on the index of the time-domain unit. In an example, the time-domain unit can be one OFDM symbol or more than one OFDM symbol. In another example, the time-domain unit is a time-domain unit of the SRS frequency-domain hopping. The SRS may occupy the same frequency-domain resource in one time-domain unit of frequency-domain hopping. The SRS may occupy different frequency-domain resources between two adjacent time-domain units of frequency-domain hopping. Each OFDM in each time-domain unit of the SRS includes the SRS. Two adjacent time-domain units of the SRS may be on non-continuous OFDM symbols. For example, the first time-domain unit is on OFDM {4, 5} in slot n, and the second time-domain unit is on OFDM {4, 5} in slot n+1.

In the described embodiments, the group number u (or the sequence number v) is denoted as a first parameter. That is, the first parameter includes one of the group number u or the sequence number v.

In some embodiments, the time-domain unit can be a repetition time-domain unit. When frequency hopping is enabled, the repetition time-domain unit and the time-domain unit of frequency-domain hopping are same.

In some embodiments, the SRS ports occupy same frequency resource in one repetition time-domain unit.

In some embodiments, the time unit can be a time-domain orthogonal cover code (TD-OCC) time-domain unit which includes T continuous OFDM symbols, wherein T is the length of the TD-OCC.

In some embodiments, the first parameter and the CS hop at a level of different types of time units. For example, the first parameter hops at a level of a first type of time unit and the CS hops at a level of a second type of time unit. In an example, the two types of time units can include different number of OFDM symbols. In other examples, the first type of time unit and the second type of time unit can be same type of time unit, e.g., include the same number of OFDM symbols.

In some embodiments, the sequence of the SRS is a low peak-to-average power ratio (PAPR) sequence. The low PAPR sequence $$r_{u,v}^{(\alpha,\delta)}(n)$$

is defined by a cyclic shift $\alpha$ of a base sequence $\bar{r}_{u,v}(n)$ according to:

$$r_{u,v}^{(\alpha,\delta)}(n) = e^{j\alpha n}\bar{r}_{u,v}(n), \ 0 \le n < M_{ZC}. \tag{1}$$

Herein, $$M_{ZC} = mN_{sc}^{RB}/2^{\delta}$$

is the length of the sequence. Multiple sequences are defined from a single base sequence through different values of a (a cyclic shift parameter) and $\delta$ (a comb parameter). In some implementations, multiple sequences are defined from a single base sequence through different values of $\alpha$. It is noted that one OFDM symbol includes $2^{\delta}$ combs, and one SRS port occupies one comb in one OFDM symbol.

In some embodiments, base sequences $\bar{r}_{u,v}(n)$ are divided into groups, wherein {u=0, 1, . . . , 29} is the group number and v is the base sequence number within the group, such that each group contains one base sequence (v=0) of each length $$M_{ZC} = mN_{sc}^{RB}/2^{\delta},$$

$1/2 \le m/2^{\delta} \le 5$ and two base sequences (v=0, 1) of each length $$M_{ZC} = mN_{sc}^{RB}/2^{\delta},$$

$6 \le m/2^{\delta}$. The definition of the base sequences $\bar{r}_{u,v}(0), \ldots, \bar{r}_{u,v}(M_{ZC}-1)$ depends on the sequence length $M_{ZC}$.

In an example, for $$M_{ZC} \ge 3N_{sc}^{RB},$$

the base sequences $\bar{r}_{u,v}(0), \ldots, (M_{ZC}-1)$ are given by:

$$\bar{r}_{u,v}(n) = x_q(n \bmod N_{ZC}) \tag{1-2}$$
$$x_q(m) = e^{-j\frac{\pi qm(m+1)}{N_{ZC}}}.$$

Herein, $$q = \lfloor \bar{q} + 1/2 \rfloor + v \cdot (-1)^{\lfloor 2\bar{q} \rfloor} \tag{1-3}$$
$$\bar{q} = N_{ZC} \cdot (u+1)/31$$

Herein, the length $N_{ZC}$ is given by the largest prime number such that $N_{ZC} < M_{ZC}$.

For $M_{ZC} = \{6, 12, 18, 24\}$, the base sequence is given by:

$$\bar{r}_{u,v}(n) = e^{j\varphi(n)\pi/4}, \ 0 \le n \le M_{ZC}-1. \tag{1-4}$$

Herein, the value of $\phi(n)$ is given by a predefined table.

For $M_{ZC} = 30$, the base sequences $\bar{r}_{u,v}(0), \ldots, (M_{ZC}-1)$ are given by:

$$\bar{r}_{u,v}(n) = e^{-j\frac{\pi(u+1)(n+1)(n+2)}{31}}, \ 0 \le n \le M_{ZC}-1. \tag{1-5}$$

As seen in the example above, the sequence of the SRS is determined by a group number u, a cyclic shift $\alpha$, and a sequence number v, which is the base sequence number v.

In some embodiments, for one SRS resource with $$N_{ap}^{SRS}$$

SRS ports, the cyclic shift $\alpha_i$ for antenna port $$p_i \in \{1000, 1000+1, \ldots, 1000+N_{ap}^{SRS}-1\}$$

is given as:

$$\alpha_i = 2\pi \frac{n_{SRS}^{cs,i}}{n_{SRS}^{cs,max}} \quad (1\text{-}6)$$

$$n_{SRS}^{cs,i} = \begin{cases} n_{SRS}^{cs} + \dfrac{n_{SRS}^{cs,max}\lfloor(p_i - 1000)/2\rfloor}{N_{ap}^{SRS}} \bmod F, & \text{if } N_{ap}^{SRS} = 4 \text{ and } n_{SRS}^{cs,max} = 6 \\[2ex] n_{SRS}^{cs} + \dfrac{n_{SRS}^{cs,max}\lfloor p_i - 1000\rfloor}{N_{ap}^{SRS}} \bmod F \end{cases}$$

or $$n_{SRS}^{cs,i} = \begin{cases} \Delta_{cs} + n_{SRS}^{cs} + \dfrac{n_{SRS}^{cs,max}\lfloor(p_i - 1000)/2\rfloor}{N_{ap}^{SRS}} \bmod F, & \text{if } N_{ap}^{SRS} = 4 \\[2ex] \quad\quad\quad \text{and } n_{SRS}^{cs,max} = 6 \\[2ex] \Delta_{cs} + n_{SRS}^{cs} + \dfrac{n_{SRS}^{cs,max}\lfloor p_i - 1000\rfloor}{N_{ap}^{SRS}} \bmod F \end{cases} \quad (1\text{-}7)$$

wherein $\Delta_{cs} \in \{0, 1, \ldots, F{-}1\}$ is configured by the gNB. The sequence of SRS port $p_i$ is given as:

$$r_{u,v}^{(\alpha_i,\delta)}(n) = e^{j\alpha_i n}\bar{r}_{u,v}(n),\ 0 \le n < M_{ZC}.$$

Herein, F is an integer. In some implementation, F equals $$n_{SRS}^{cs,max},$$

which is a maximal number of cyclic shifts for one comb. In some implementation, $n_{SRS}^{cs,max}$ depends on the number of comb.

In some embodiments, the first parameter and the cyclic shift changes simultaneously when the time-domain unit index changes to reduce the inter-cell interference of SRS. The CS hopping equation is configured (or designed) to ensure that the CS is different when the first parameter is same at a given time. Alternatively, the first parameter hopping equation is configured (or designed) to ensure that the first parameter is different when the CS is same at a given time.

For example, the group number u is determined by following equations:

$$u = \left(f_{gh} + n_{ID}^{SRS}\right) \bmod C \quad (2\text{-}1)$$

wherein $f_{gh}$ is determined by one of $$f_{gh} = \left(\sum_{m=0}^{D-1} c\left(D\left(n_{s,f}^{\mu} N_{symbol}^{slot} + l_0 + l'\right) + m\right)2^m\right) \bmod C \quad (2\text{-}2)$$

$$f_{gh} = \left(\sum_{m=0}^{D-1} c\left(D\left(n_{s,f}^{\mu} N_{symbol}^{slot} + l_{firsttimeunit}\right) + m\right)2^m\right) \bmod C. \quad (2\text{-}3)$$

Herein, $$n_{ID}^{SRS}$$

is determined by a signaling or by determined by a rule. For example, if the UE has not received $$n_{ID}^{SRS}$$

configuration for a SRS resource, the $$n_{ID}^{SRS}$$

of the SRS resource is $$n_{ID}^{cell}.$$

In this scenario, $$n_{ID}^{cell}$$

is selected by the UE during initial access to a cell or $$n_{ID}^{cell}$$

is a physical cell index for a serving cell.
In some implementation, $$n_{ID}^{SRS}$$

is an integer belonging to [0, 1024]. In other implementations, $$n_{ID}^{SRS}$$

is an integer belonging to [0, 65535]. In yet other implementations, $$n_{ID}^{SRS}$$

belongs to [0, N], where N is an integer. In general, $$n_{ID}^{SRS}$$

is configured for an SRS resource that includes the SRS.
In Equation (1-2), $$n_{s,f}^{\mu}$$

is an index of a slot including the SRS and corresponding to sub-carrier space $2^\mu * 15$ kHz in a frame, and $l_0+l'$ is an index of OFDM symbol including the SRS in a slot. The index $l_0+l'$ is an OFDM index among $$N_{symbol}^{slot}$$

OFDM symbols in the slot, and $$N_{symbol}^{slot}$$

is the number of OFDM symbols in one slot, $l_0$ is the index of starting OFDM symbol including the SRS in the slot, and l' is relative index of a SRS OFDM symbol which is relative to the starting OFDM symbol including the SRS in the slot. If a first type of time unit includes more than one OFDM symbol and the first parameter hops at a level of first type of time unit, the l' is the relative index of a SRS OFDM symbol that is relative to the starting OFDM symbol that includes the SRS in the slot, except in the case of OFDM symbols in one first type of time unit in which case l' is the relative index of a starting SRS OFDM symbol in the one first type of time unit. Further, C is the total number of groups. In an example, C equals to 30. In another example, C is a value larger than 30. $2^D$ is equal to or larger than C. For example, D equals to 8. Herein, $l_{firsttimeunit}$ is an index of a first type of time unit.

Continuing with (2-2) or (2-3), c(x) is the x-th bit in a generic pseudo-random sequence, which may be defined by a length-31 Gold sequence. The output sequence c(n) of length $M_{PN}$, where n=0, 1, . . . , $M_{PN}-1$ is defined by:

$$c(n) = (x_1(n+N_C) + x_2(n+N_C)) \bmod 2 \quad (3)$$
$$x_1(n+31) = (x_1(n+3) + x_1(n)) \bmod 2$$
$$x_2(n+31) = (x_2(n+3) + x_2(n+2) + x_2(n+1) + x_2(n)) \bmod 2$$

Herein, and in an example, $N_C=1600$, the first m-sequence $x_1(n)$ may be initialized with $x_1(0)=1$, $x_1(n)=0$, n=1, 2, . . . , 30, and the initialization of the second m-sequence, $x_2(n)$, is denoted by $$c_{init} = \sum_{i=0}^{30} x_2(i) \cdot 2^i$$

with the value depending on the application of the sequence. Thus, different values of $c_{init}$ results in the generation of different pseudo-random sequences.

In some embodiments, the $c_{init}$ for generating pseudo-random sequence for group number u in equation (2-1) or (2-3) can be determined by one of following methods:

$$c_{init} = n_{ID}^{SRS} \quad (4)$$
$$c_{init} = \left\lfloor \frac{n_{ID}^{SRS}}{C} \right\rfloor \quad (5)$$

In a first implementation, to generate the CS hopping pattern and the first parameter hopping pattern, the first parameter is based on a first pseudo-random sequence generated by a first value of $c_{init}$ and the CS is based on a second pseudo-random sequence generated by a second value of $c_{init}$. For example, the group number is determined by a first pseudo-random sequence with a first value of $c_{init}$ that is determined by one of equations (4) or (5). The second value of $c_{init}$ for generating the second pseudo-random sequence is determined by one of following equations:

$$c_{init} = \left\lfloor n_{ID}^{SRS}/C \right\rfloor \bmod F \quad (6)$$
$$c_{init} = \left\lfloor (f_{gh} + n_{ID}^{SRS})/C \right\rfloor \bmod F \quad (7)$$
$$c_{init} = n_{ID,2}^{SRS} \quad (8)$$
$$c_{init} = n_{ID}^{SRS} + \Delta \quad (9\text{-}1)$$
$$c_{init} = \left( \left\lfloor f_{gh} + n_{ID}^{SRS} \right\rfloor /C + k \right) \bmod F; \quad (9\text{-}2)$$
$$c_{init} = \left( \left\lfloor f_{gh} + n_{ID}^{SRS} \right\rfloor /C + k(l) \right) \bmod F; \text{ or} \quad (9\text{-}3)$$
$$c_{init} = \left( \left\lfloor f_{gh} + n_{ID}^{SRS} \right\rfloor /C + k_0 + k(l) \right) \bmod F. \quad (9\text{-}4)$$

Herein, F is an integer. In some implementation, F equals to $$n_{SRS}^{cs,max}$$

which is the maximal number of cyclic shifts for one comb, and may depend on the number of combs.

$$n_{ID,2}^{SRS}$$

is a value configured by the gNB, and $\Delta$ is an integer configured by gNB or is determined by a rule. In an example, $\Delta$ is determined by C-RNTI of the UE. In another example, $\Delta$ is determined by PCI (physical cell index) associated with the SRS resource. In some implementations, A can be configured per UE, per serving cell, per PCI, or per SRS resource set which includes one or more SRS resources. In some implementations, the number of bits used to configure $\Delta$ is fewer than the number of bits used to configure $$n_{ID}^{SRS}.$$

For example, the number of bits used to configure the $\Delta$ is 3 bits and the number of bits used to configure $$n_{ID}^{SRS}$$

is 10 bits. k and $k_0$ belong to {0, 1, . . . , F−1} and are configured by the network node, and k(l) belongs to {0, 1, . . . , F−1} and is determined by an OFDM symbol index $l=l_0+l'$.

In some embodiments, the second pseudo-random sequence is generated according to the second value of $c_{init}$ as shown in one of equation (6)-(9), $$n_{s,f}^{\mu}, N_{symbol}^{slot}$$

and $l_0+l$. For example, $f_{cs}$ is determined by one of following equations:

$$f_{cs} = \left(\sum_{m=0}^{E-1} c\left(E\left(n_{s,f}^{\mu}N_{symbol}^{slot} + l_0 + l'\right) + m\right)2^m\right) \bmod F, \tag{10-1}$$

$$f_{cs} = \sum_{m=0}^{E-1} c\left(E\left(n_{s,f}^{\mu}N_{symbol}^{slot} + l_0 + l'\right) + m\right)2^m, \tag{11-1}$$

$$f_{cs} = \left(\sum_{m=0}^{E-1} c\left(E\left(n_{s,f}^{\mu}N_{symbol}^{slot} + l_{secondtimeunt}\right) + m\right)2^m\right) \bmod F, \text{ or} \tag{10-2}$$

$$f_{cs} = \sum_{m=0}^{E-1} c\left(E\left(n_{s,f}^{\mu}N_{symbol}^{slot} + l_{secondtimeunt}\right) + m\right)2^m. \tag{11-2}$$

Herein, E is an integer. For example, $2^E$ is greater than or equal to F, e.g., E is equal to 4, 5, or 6. Herein, in response to one of the second type of time unit including one OFDM symbol, $l_0$ is an index of a starting OFDM symbol comprising the SRS in the slot, and l' is a relative index of an SRS OFDM symbol that is relative to the starting OFDM symbol comprising the SRS in the slot. Herein, in response to one of the second type of time unit including more than one OFDM symbol, $l_0$ is an index of a starting OFDM symbol comprising the SRS in the slot, l' is a relative index of an SRS OFDM symbol that is relative to the starting OFDM symbol except for the case of OFDMs in one time unit in which case l' is a relative index of a first SRS OFDM symbol in the one time unit and wherein $l_{secondtimeunit}$ is an index of the second type of time unit including the SRS. The CS hops at a level of the second type of time unit. The CS remains same over OFDM symbols in one second type of time unit and hops between two adjacent two second type of time units.

In a second implementation, to generate the CS hopping pattern and the first parameter hopping pattern, the first parameter and the CS can be based on a same pseudo-random sequence with a same value of $c_{init}$. In some implementations, the first parameter and the CS parameter are based on bits in different locations of the same bit sequence, respectively. In other implementations, the first set of bits in the sequence used for the first parameter and the second bits in the sequence used for the CS parameter can overlap (or be the same). For example, the group number u and cyclic shift is based on a same pseudo-random sequence, but they correspond to different bit location of the same pseudo-random sequence.

In an example, the same pseudo-random sequence is generated with determined by one of equations (4)-(9). In a first scenario, $$f_{gh} = \left(\sum_{m=0}^{D-1} c\left((D+E)\left(n_{s,f}^{\mu}N_{symbol}^{slot} + l_0 + l'\right) + m\right)2^m\right) \bmod C \tag{12}$$

$$f_{cs} = \left(\sum_{m=0}^{E-1} c\left((D+E)\left(n_{s,f}^{\mu}N_{symbol}^{slot} + l_0 + l'\right) + D + m\right)2^m\right) \bmod F, \tag{13}$$

or $$f_{cs} = \left(\sum_{m=0}^{E-1} c\left((D+E)\left(n_{s,f}^{\mu}N_{symbol}^{slot} + l_0 + l'\right) + D + m\right)2^m\right). \tag{14}$$

In a second scenario, $$f_{gh} = \left(\sum_{m=0}^{D-1} c\left((D+E)\left(n_{s,f}^{\mu}N_{symbol}^{slot} + l_0 + l'\right) + E + m\right)2^m\right) \bmod C \tag{15}$$

$$f_{cs} = \left(\sum_{m=0}^{E-1} c\left((D+E)\left(n_{s,f}^{\mu}N_{symbol}^{slot} + l_0 + l'\right) + m\right)2^m\right) \bmod F, \text{ or} \tag{16-1}$$

$$f_{cs} = \left(\sum_{m=0}^{E-1} c\left((D+E)\left(n_{s,f}^{\mu}N_{symbol}^{slot} + l_0 + l'\right) + m\right)2^m\right). \tag{16-2}$$

In a third scenario, $$f_{gh} = \left(\sum_{m=0}^{D-1} c\left(D*\left(n_{s,f}^{\mu}N_{symbol}^{slot} + l_0 + l'\right) + m\right)2^m\right) \bmod C, \tag{16-3}$$

$$f_{cs} = \left(\sum_{m=0}^{E-1} c\left(E*\left(n_{s,f}^{\mu}N_{symbol}^{slot} + l_0 + l'\right) + m\right)2^m\right) \bmod F \text{ or} \tag{16-4}$$

$$f_{cs} = \left(\sum_{m=0}^{E-1} c\left(E\left(n_{s,f}^{\mu}N_{symbol}^{slot} + l_0 + l'\right) + m\right)2^m\right). \tag{16-5}$$

Then, $n_{SRS}^{cs}$ in Equation (1-6) or (1-7) is determined by one of following equations:

$$n_{SRS}^{cs} = \left(f_{cs} + n_{ID,2}^{SRS}\right)\bmod F \tag{17}$$

$$n_{SRS}^{cs} = \left(f_{cs} + n_{ID}^{SRS} + \Delta\right)\bmod F \tag{18-1}$$

$$n_{SRS}^{cs} = \left(f_{cs} + n_{ID}^{SRS}\right)\bmod F \tag{18-2}$$

$$n_{SRS}^{cs} = f_{cs}. \tag{19}$$

In this framework, the $$N_{ap}^{SRS}$$

SRS ports of one SRS resource share a same CS hopping pattern determined by $f_{cs}$.

In a third implementation, the CS hopping is determined by the first parameter hopping pattern, or the first parameter is determined by the CS hopping. For example, $$n_{SRS}^{cs}$$

in equation (1-6) or (1-7) is determined by one of following equation:

$$n_{SRS}^{cs} = \left\lfloor\left(f_{gh} + n_{ID}^{SRS}\right)/C\right\rfloor\bmod F \tag{20-1}$$

$$n_{SRS}^{cs} = \left(\left\lfloor f_{gh} + n_{ID}^{SRS}\right\rfloor/C + k\right)\bmod F; \tag{20-2}$$

$$n_{SRS}^{cs} = \left(\left\lfloor f_{gh} + n_{ID}^{SRS}\right\rfloor/C + k(l)\right)\bmod F; \text{ or} \tag{20-3}$$

$$n_{SRS}^{cs} = \left(\left\lfloor f_{gh} + n_{ID}^{SRS}\right\rfloor/C + k_0 + k(l)\right)\bmod F. \tag{20-4}$$

wherein k and $k_0$ belong to $\{0, 1, \ldots, F-1\}$ and is configured by the network node, and k(l) belongs to $\{0, 1, \ldots, F-1\}$ and is determined by an OFDM symbol index $l=l_0+l'$ or is determined by an index of the second time unit.

Similarly, if the first parameter is sequence number v, the sequence number and the CS both change when the time-domain unit index changes. Herein, the sequence number is determined by following equation:

$$v = \begin{cases} c\left(n_{s,f}^{\mu}N_{symb}^{slot} + l_0 + l'\right), & M_{sc,b}^{SRS} \geq 6N_{sc}^{RB} \\ 0, & \text{otherwise} \end{cases} \qquad (21)$$

In a first implementation, the sequence number and the CS are based on different sequences. The sequence number is based on a first pseudo-random sequence c(x) with a first value of $c_{init}$ which is determined by one of Equations (4) or (5). The CS is based on a second pseudo-random sequence c(x) with a second value of $c_{init}$ determined by one of Equations (6), (8), (9), (22), (23), (24-1), (24-2), (24-3), or (24-4).

$$c_{init} = \left(n_{ID}^{SRS} * (v + 1)\right) \bmod F \qquad (22)$$

$$c_{init} = \left(n_{ID}^{SRS} + v * P\right) \bmod F \qquad (23)$$

$$c_{init} = \left(n_{ID}^{SRS} + v\right) \bmod F \qquad (24-1)$$

$$c_{init} = \left\lfloor n_{ID}^{SRS}/2\right\rfloor \bmod F \qquad (24-2)$$

$$c_{init} = \left(\left\lfloor n_{ID}^{SRS}/C\right\rfloor + k(l)\right) \bmod F \qquad (24-3)$$

$$c_{init} = \left(\left\lfloor n_{ID}^{SRS}/C\right\rfloor + k\right) \bmod F \qquad (24-4)$$

wherein k and $k_0$ belong to {0, 1, . . . , F−1} and is configured by the network node, and k(l) belongs to {0, 1, . . . , F−1} and is determined by an OFDM symbol index $l=l_0+l'$ or is determined by an index of the second time unit.

Herein, P is an integer. In some implementation, P is large than or equals to the largest available value of $$n_{ID}^{SRS}.$$

For example, if $$0 \leq n_{ID}^{SRS} \leq 1023,$$

P equals 1024. If $$0 \leq n_{ID}^{SRS} \leq 65535,$$

P equals 65536. The $$n_{SRS}^{cs}$$

in equation (1-6) or (1-7) is determined by one of Equations (17)-(19), $f_{cs}$ is determined by one of Equations (10) or (11), k belongs to {0, 1, . . . , F−1} and is configured by gNB, k(l) belongs to {0, 1, . . . , F−1} and is determined by OFDM symbols index $l=l_0+l'$. For example, k changes for different l. In some implementations, l is the OFDM symbol index in a slot except for the case of OFDM symbols being in each of the second type of time unit in which case l is the starting OFDM symbol index in the each second type of time unit.

In a second implementation, the sequence number and the CS is based on different bits in a same sequence. For example, the $c_{init}$ of the same sequence is determined by one of Equations (4) or (5). For example, the sequence number is determined by one of following equations:

$$v = \begin{cases} c\left((H + E)n_{s,f}^{\mu}N_{symb}^{slot} + E + l_0 + l'\right), & M_{sc,b}^{SRS} \geq 6N_{sc}^{RB} \\ 0, & \text{otherwise} \end{cases} \qquad (25)$$

$$v = \begin{cases} c\left((H + E)n_{s,f}^{\mu}N_{symb}^{slot} + l_0 + l'\right), & M_{sc,b}^{SRS} \geq 6N_{sc}^{RB} \\ 0, & \text{otherwise} \end{cases} \qquad (26-1)$$

$$v = \begin{cases} c\left(n_{s,f}^{\mu}N_{symb}^{slot} + l_0 + l'\right), & M_{sc,b}^{SRS} \geq 6N_{sc}^{RB} \\ 0, & \text{otherwise} \end{cases} \qquad (26-2)$$

Herein, H is an integer. For example, H is equal to 1.
In some embodiments, the $$n_{SRS}^{cs}$$

in Equations (1-6) or (1-7) is determined by one of Equations (17), (18-1), (18-2) or (19), and the $f_{cs}$ is determined by one of following equations:

$$f_{cs} = \left(\sum_{m=0}^{E-1} c\left((H + E)\left(n_{s,f}^{\mu}N_{symbol}^{slot} + l_0 + l'\right) + H + m\right)2^m\right) \bmod F \qquad (27)$$

$$f_{cs} = \left(\sum_{m=0}^{E-1} c\left((H + E)\left(n_{s,f}^{\mu}N_{symbol}^{slot} + l_0 + l'\right) + H + m\right)2^m\right) \qquad (28)$$

$$f_{cs} = \left(\sum_{m=0}^{E-1} c\left((H + E)\left(n_{s,f}^{\mu}N_{symbol}^{slot} + l_0 + l'\right) + m\right)2^m\right) \bmod F \qquad (29)$$

$$f_{cs} = \left(\sum_{m=0}^{E-1} c\left((H + E)\left(n_{s,f}^{\mu}N_{symbol}^{slot} + l_0 + l'\right) + m\right)2^m\right) \qquad (30-1)$$

$$f_{cs} = \left(\sum_{m=0}^{E-1} c\left(E * \left(n_{s,f}^{\mu}N_{symbol}^{slot} + l_0 + l'\right) + m\right)2^m\right) \qquad (30-2)$$

$$f_{cs} = \left(\sum_{m=0}^{E-1} c\left(E * \left(n_{s,f}^{\mu}N_{symbol}^{slot} + l_{secondtimeunit}\right) + m\right)2^m\right). \qquad (30-3)$$

It is noted that Equations (13) and (14) have a similar form to Equations (27) and (28), and Equations (16-1) and (16-2) have a similar form to Equations (29) and (30).

In a third implementation, the CS hopping is determined by the first parameter hopping pattern. For example, the sequence number is determined by Equation (21), and the CS is determined by one of following equations:

$$n_{SRS}^{cs} = \left(n_{ID}^{SRS} * (v + 1)\right) \bmod n_{SRS}^{cs,max} \qquad (31)$$

$$n_{SRS}^{cs} = \left(n_{ID}^{SRS} + v * P\right) \bmod n_{SRS}^{cs,max} \qquad (32)$$

$$n_{SRS}^{cs} = \left(n_{ID}^{SRS} + v\right) \bmod n_{SRS}^{cs,max}. \qquad (33)$$

In some embodiments, the equation used to determine CS is different in different modes. In a first mode, both the CS and group number hop when the time-domain unit index changes, but the sequence number does not hop. In the first mode, the CS may be determined by one of Equations (17)-(20) and $f_{cs}$ is determined by one of Equations (10), (11), (13), (14), (16-1) or (16-2). In a second mode, both the CS and the sequence number hop when the time-domain unit index changes, but the group number does not hop. In the second mode, the CS may be determined by one of Equations (17)-(19) and (31)-(33), and $f_{cs}$ is determined by one of equation (10), (11), (27), (28), (29) or (30).

In yet other modes, only one of the group number, the sequence number, or the CS hops when the time-domain unit index changes. For example, there in a third mode, only the group number hops when the time-domain unit index changes, but the sequence number and the CS do not hop. Furthermore, in yet another mode, all of the group number, the sequence number and the CS do not change when the time-domain unit index changes. In these scenarios, the gNB is configured to inform the UE which mode should be used by the UE when it transmits the SRS.

In the embodiments described above, the first time-domain unit for the first parameter hopping and the second time-domain unit for CS hopping may be the same. Herein, the first parameter changes when the first type of time-domain unit index changes, and remains constant within a first time-domain unit. Similarly, the CS changes when the second time-domain unit index changes, and remains constant within a second time-domain unit. In an example, the first and the second time-domain units may be one OFDM symbol, or one time unit of SRS frequency hopping which includes one or more OFDM symbols. In other embodiments, the first type of time-domain unit is different from the second type of time-domain unit. For example, the first type of time-domain unit includes one OFDM symbols, whereas the second type of time-domain unit includes more than one OFDM symbol. In some implementations, the OFDM symbol index in $l_0+l'$ hopping equation such as equation (2), (10)-(16) and (25)-(30) is the same for all OFDM symbols in the second type of time unit or the first type of time unit. For example, l' is the relative index of starting SRS OFDM symbol in each time unit for all OFDM symbols in each time unit which includes the second type of time unit and/or the first type of time unit. Alternatively, $l_0+l'=l_{firsttimeunit}$ in hopping equation of the first parameter, and $l_0+l=l_{secondtimeunit}$ in hopping equation of the CS parameter. In some implementations, $$l_{firsttimeunit} = n_{SRS} = \left( \frac{N_{slot}^{fram,\mu} n_f + n_{s,f}^{\mu} - T_{offset}}{T_{SRS}} \right) * \left( \frac{N_{symb}^{SRS}}{R} \right) + \left\lfloor \frac{l''}{R} \right\rfloor,$$

wherein l" is a relative index of the SRS OFDM symbol which is relative to the $l_0$, $$N_{slot}^{frame}$$

is the number of slot in one frame, $n_f$ is the frame index, $T_{offset}$, $T_{SRS}$ is a period offset of SRS and a period of SRS, respectively, R is repetition factor of the SRS (e.g., the number of OFDM in the time unit of frequency hopping), $$N_{symbol}^{SRS}$$

is the number of OFDM symbols including the SRS in one slot, and $n_{SRS}$ is time unit index of the frequency hopping of the SRS. In some implementations, $$l_{secondtimeunit} = n_{SRS} = \left( \frac{N_{slot}^{fram,\mu} n_f + n_{s,f}^{\mu} - T_{offset}}{T_{SRS}} \right) * \left( \frac{N_{symb}^{SRS}}{R} \right) + \left\lfloor \frac{l''}{R} \right\rfloor.$$

Example Embodiments with a Time-Domain Orthogonal Cover Code (TD-OCC)

Embodiments of the disclosed technology may be implemented such that (i) one SRS resource corresponds to one TD-OCC, or (ii) one SRS resource corresponds to more than one TD-OCC, wherein one SRS resource may include one or more SRS resources. In some implementations, option (ii) is better suited for the co-scheduling of SRS resources of different UEs with different repetition factors. For example, two combs and two CSs may be allocated to one SRS resource with four SRS ports. If using TD-OCC with a repetition factor of 4, one comb and one CS may be allocated to one SRS resource. Different combs and different CSs can be allocated to different UEs with different repetition factors.

The described embodiments that employ TD-OCCs are well suited for scenarios where the UE are moving with low speed, whereas using the CS embodiments (as described in the previous section) are better suited for scenarios with low delay spread.

In some embodiments, SRS ports in one SRS resource can be multiplexed by at least one of CS, TD-OCC, or comb, based on the scenario. Signaling can be used to inform the multiplexing type for the SRS ports of one SRS resource. For example, the signaling informs SRS ports can occupy one comb in one SRS resource, or occupy different cyclic shifts, or occupy different TD-OCC. When the SRS ports of one comb in one SRS resource occupy different cyclic shifts, the SRS ports are multiplexed using different cyclic shifts, i.e., the SRS ports are multiplexed using FD-OCC. When the SRS ports of one comb in one SRS resource occupy different TD-OCC, the SRS ports are multiplexed by different TD-OCC.

In some embodiments, the length of TD-OCC may be signaled, or is equal to the repetition factor R, or the repetition factor R includes multiples of the TD-OCC length. The SRS ports may occupy the same frequency-domain resource in one repetition time-domain unit. If frequency hopping is enabled, the SRS ports occupies different frequency-domain resources in two adjacent repetition time-domain units. That is, the repetition time-domain unit can be designated as the time-domain unit of the SRS frequency-domain hopping.

In an example, if frequency-hopping is enabled in one slot, {R=1, 2, 4, 5, 6, 7, 8, 10, 12, 14}, the length of the TD-OCC can be dynamically signaled, and the candidates of the length of TD-OCC can be one of {1, 2, 4, 5, 6, 7, 8, 10, 12, 14}.

In another example, if frequency-hopping is disabled in one slot, {R=1, 2, 4, 8, 10, 12, 14}, the candidates of the length of TD-OCC can be one of the values in the set {1, 2, 4, 8, 10, 12, 14}.

In yet another example, if TD-OCC is enabled, there are two options with respect to establishing the relationship between the time unit of sequence hopping and the length of the TD-OCC. For example, the length of TD-OCC The relation can be represented by one of following equations:

15

$$\begin{bmatrix} y_1 \\ y_2 \\ y_3 \\ y_4 \end{bmatrix} \cong \begin{bmatrix} r_1 & 0 & 0 & 0 \\ 0 & r_2 & 0 & 0 \\ 0 & 0 & r_3 & 0 \\ 0 & 0 & 0 & r_4 \end{bmatrix} \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} h_1 \\ h_2 \\ h_3 \\ h_4 \end{bmatrix} + n \quad (34)$$

$$\begin{bmatrix} y_1 \\ y_2 \\ y_3 \\ y_4 \end{bmatrix} \cong \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} r^1 h_1 \\ r^2 h_2 \\ r^3 h_3 \\ r^4 h_4 \end{bmatrix} + n. \quad (35)$$

Herein, $y_i$ corresponds to the received signal on the i-th resource element (RE) of one TD-OCC, n is the noise on the channel, and $h_i$ is the channel associated with the i-th TD-OCC. For example, $h_1$ corresponds to [1, 1, 1, 1], $h_2$ corresponds to, corresponds to [1, 1, −1, −1], and $h_4$ corresponds to [1, −1, −1, 1], and r is the sequence of SRS that can be determined by Equation (1-1).

If Equation (34) is used (denoted option #1), the SRS sequence can be different on different OFDM symbols of the 4 OFDM symbols corresponding to the TD-OCC, and the time unit of the sequence hopping may be independent of the TD-OCC. However, two SRS resources (or two SRS ports) with partial overlapping bandwidth cannot be orthogonal, or two SRS resources (or two SRS ports) with same overlapping bandwidth can be orthogonal. For example, the port group is determined by Equations (36) or (37) and the sequence number v can be determined by Equation (38):

$$u = (f_{gh} + n_{ID}^{SRS}) \bmod C \quad (36)$$

$$f_{gh} = \left( \sum_{m=0}^{D-1} c(D(n_{s,f}^\mu N_{symbol}^{slot} + l_0 + l') + m)2^m \right) \bmod C \quad (37)$$

$$v = \begin{cases} c(n_{s,f}^\mu N_{symb}^{slot} + l_0 + l'), & M_{sc,b}^{SRS} \geq 6N_{sc}^{RB} \\ 0, & \text{otherwise} \end{cases} \quad (38)$$

Alternatively, if Equation (35) is used (denoted option #2), the SRS sequence may be the same on the 4 OFDM symbols corresponding to the TD-OCC, the time unit of sequence hopping is equal to or greater than the length of TD-OCC, and two SRS resources (or two SRS ports) with partial overlapping bandwidth can be orthogonal. If the time-domain unit of sequence hopping is equal to X, then the group number u is determined by Equations (39) and (40).

$$u = (f_{gh} + n_{ID}^{SRS}) \bmod C \quad (39)$$

$$f_{gh} = \left( \sum_{m=0}^{D-1} c(D(\lfloor (n_{s,f}^\mu N_{symbol}^{slot} + l_0 + l')/x \rfloor) + m)2^m \right) \bmod C. \quad (40)$$

For option #2, the group number u may still be determined by Equation (37), where l' is the relative index of an SRS OFDM symbol which is relative to the starting OFDM symbol of SRS except for the case of each time unit of SRS sequence hopping in which case l' is the relative index of the first SRS OFDM symbol in each time-domain unit of SRS sequence hopping. For example, if one SRS resource occupies OFDM {4,5,6,7} in one slot and x equals 2, then $l_0$=4 and for OFDM {4, 5}, l' is the same and equals 4, and for OFDM {6, 7}, l' is the same and equals 6. That is, for all OFDM symbols in one time domain unit of SRS sequence, l' is same and equals a value of l' that corresponds to the first OFDM symbol of one time-domain unit of SRS sequence hopping.

Continuing with option #2, the sequence number v can be determined by Equation (41). Alternatively, the sequence number v may still be determined by Equation (38) and l' is the relative index of a SRS OFDM symbol which is relative to the starting OFDM symbol of SRS except for the case of each time unit in which case l' is the relative index of the first SRS OFDM symbol in one time domain unit of sequence hopping.

In some embodiments, if the TD-OCC is used for ports on one SRS resource, the time-domain unit of sequence hopping can be 1, i.e., option #1 can be used. If TD-OCC is used for ports on different SRS resource with partial bandwidth, option #2 can be used.

In some embodiments, if the length of TD-OCC is less than or equal to the number of SRS ports multiplexed by different TD-OCC in one SRS resource, option #1 can be used, otherwise, option #2 can be used.

In some embodiments, the TD-OCC can be used first on SRS ports in one SRS resource and then on SRS ports on different SRS resources. Herein, the time unit of sequence hopping can be signaled. For example, the candidate of the time unit of sequence hopping can be {1, length of TD-OCC}. The length of TD-OCC can be different for different periods of the SRS resource considering different MU UE. Herein, the TD-OCC length can be dynamically communicated to the UE.

In some embodiments, the comb, CS and/or TD-OCC parameter for SRS ports in one SRS resource can be constrained by a relationship. For example, one of the comb, CS and TD-OCC parameter for SRS ports in one SRS resource can be determined by the other two parameters. Alternatively, one of the comb, CS and TD-OCC parameters for SRS ports in one SRS resource may be determined by one of the other two parameters.

In some embodiments, the comb and CS mapping are based on the TD-OCC allocation. For example, $$N_{ap}^{SRS}$$

in Equation (1-5) may be replaced with $$N_{ap,oneTD-OCC,oneComb}^{SRS},$$

which is the number of SRS ports with same TD-OCC index in same comb in one SRS resource. The same TD-OCC index corresponds to one TD-OCC. For example, the SRS port {0~1} uses TD-OCC [1,1], and the SRS port {2~3} uses TD-OCC [1, −1], and the four SRS ports are in same comb, and $$N_{ap,oneTD-OCC,oneComb}^{SRS} = 2.$$

The CS for SRS port i is determined by one of following equations:

$$n_{SRS}^{cs,i} = n_{SRS}^{cs} + \frac{n_{SRS}^{cs,max} \lfloor (p_i - 1000)/N_{ap,oneTD-OCC \text{ and } oneComb}^{SRS} \rfloor}{N_{ap,oneTD-OCC \text{ and } oneComb}} \bmod F \quad (34)$$

17 18

-continued $$
n_{SRS}^{cs,i} = \begin{cases} n_{SRS}^{cs} + \dfrac{n_{SRS}^{cs,max} \lfloor (p_i - 1000)/2 \rfloor}{N_{ap,oneTD-OCC}^{SRS}} \bmod F, & (35) \\ \quad \text{if } N_{ap}^{SRS} = 4 \text{ and } n_{SRS}^{cs,max} = 6 \\ n_{SRS}^{cs} + \dfrac{n_{SRS}^{cs,max} \lfloor p_i - 1000 \rfloor}{N_{ap,TD-OCC}^{SRS}} \bmod F \end{cases}.
$$

Herein, $$
N_{ap,oneTD-OCC}^{SRS}
$$

is a number of SRS ports corresponding to one TD-OCC index, and the comb is determined by following equation:

$$
k_{TC}^{(p_i)} = \begin{cases} (\bar{k}_{TC} + K_{TC}/2) \bmod K_{TC} & \text{if } N_{ap,oneTD-OCC}^{SRS} = 4,\ p_i \in \{1001, 1003\},\ \text{and } F = 6 \\ (\bar{k}_{TC} + K_{TC}/2) \bmod K_{TC} & \text{if } N_{ap,oneTD-OCC}^{SRS} = 4,\ p_i \in \{1001, 1003\},\ \text{and } n_{SRS}^{cs} \in \{F/2,\ \ldots,\ F-1\} . \\ \bar{k}_{TC}, & \text{otherwise} \end{cases}
$$

Example Embodiments Using Downlink Control Information (DCI)

In some embodiments, the sequence of SRS resource is determined by a parameter of $$
n_{ID}^{SRS}
$$

that is indicated by downlink control information (DCI). In some implementations, the DCI directly indicates the absolute value of $$
n_{ID}^{SRS}
$$

using 10 bits or more than 10 bits. In another implementation, the DCI indicates the relative index of $$
n_{ID}^{SRS}
$$

using fewer than 10 bits. In an example, RRC/MAC-CE signaling may be used to indicate a list of candidate value of $$
n_{ID}^{SRS} .
$$

In another example, the DCI informs the relative index of $$
n_{ID}^{SRS}
$$

for one set of SRS resources. Optionally, the one set of SRS resources is associated with a trigger state of SRS request field. The RRC may not include $$
n_{ID}^{SRS}
$$

for the SRS resource in the set of SRS resources. The relative index of $$
n_{ID}^{SRS}
$$

is an index of $$
n_{ID}^{SRS}
$$

among the list of candidate values of $$
n_{ID}^{SRS} .
$$

In some embodiments, the group number u of the sequence of the SRS resource is determined by following equations:

$$
u = \left( f_{gh} + n_{ID}^{SRS} \right) \bmod C
$$

$$
f_{gh} = \left( \sum_{m=0}^{D-1} c\left( D\left( n_{s,f}^{\mu} N_{symbol}^{slot} + l_0 + l' \right) + m \right) 2^m \right) \bmod C.
$$

Herein, c(x) is the x-th bit in generic pseudo-random sequence which is generated with an initial value of $$
c_{init} = n_{ID}^{SRS}, \text{ wherein } n_{ID}^{SRS}
$$

may be determined by DCI signaling.

In some embodiments, the sequence number v of the sequence of the SRS resource is determined by following equations:

$$
v = \begin{cases} c\left( n_{s,f}^{\mu} N_{symb}^{slot} + l_0 + l' \right), & M_{sc,b}^{SRS} \geq 6 N_{sc}^{RB} \\ 0, & \text{otherwise} \end{cases}
$$

Herein, $c(x)$ is the x-th bit in generic pseudo-random sequence which is generated with an initial value of $$c_{init} = n_{ID}^{SRS}, \text{ wherein } n_{ID}^{SRS}$$

may be determined by DCI signaling.

In some embodiments, the CS of the sequence of the SRS resource is determined a generic pseudo-random sequence which is generated with an initial value of $c_{init}$, wherein $c_{init}$ is based on $$n_{ID}^{SRS},$$

and wherein $$n_{ID}^{SRS}$$

may be determined by DCI signaling.

Example Embodiments Using the Comb Parameter

In some embodiments, the sequence parameter of SRS resource is determined by the comb index. For example, different SRS ports in different comb indexes can correspond to different TD-OCC or different CS parameters.

In some embodiments, the comb index of one SRS port hops at a level of a third type of time unit. In an example, the comb index remains same for all OFDM symbols in one third type of time unit. In another example, the comb index hops between two third type of time units. Herein, one third type of time unit includes one or more OFDM symbols.

In some embodiments, the comb index of one SRS port hops at a level of a frequency unit. In an example, the comb index remains same for all physical resource blocks (PRBs) in one frequency unit. In another example, the comb index hops between two one frequency units. Herein, one frequency unit includes one or more PRBs.

Example Embodiments Using Partially Overlapping SRS Resources

In some embodiments, if one SRS resource partially overlaps with either PUCCH, PUSCH, or another SRS resource in one or more OFDM symbols, then the one SRS resource will be dropped on the one or more OFDM symbols according to some priority rule. In these scenarios, the TD-OCC and the length of TD-OCC may be determined based on the number of remaining OFDM symbols of the SRS.

For example, the one SRS resource may be configured with four OFDM symbols in one slot and with a TD-OCC of length 4. If the one SRS resource overlaps with PUCCH, PUSCH, or another SRS resource in one OFDM symbol of the four OFDM symbols, the one SRS resource is transmitted only on the remaining three OFDM symbols and the TD-OCC of the one SRS resource is replaced with a TD-OCC of length 3. Herein, three TD-OCC of length 3 correspond to three TD-OCC of length 4. If the TD-OCC of length 4 does not have a corresponding TD-OCC of length 3, then the one SRS resource is not transmitted on the four OFDM symbols. That is, the whole SRS resource is not transmitted and is dropped.

In some embodiments, if the SRS ports of the one SRS resource are multiplexed by the TD-OCC, the TD-OCC and the length of the TD-OCC of the one SRS resource is determined by the remaining OFDM symbols of the SRS. Alternatively, the multiplexing type of the SRS ports of the one SRS resource may be changed.

Example Embodiments Using Beamforming

In some embodiments, and if the SRS ports are configured for antenna switching, the SRS is transmitted with a precoding matrix W. In these scenarios, the SRS ports are beamformed SRS ports. Example methods for transmitting using beamformed SRS ports include:

Method 1. Each SRS port corresponds to a beam, and there is a one-to-one mapping between N SRS ports and N beams. Herein, the transmission vector is given as $$Z = \begin{bmatrix} W_1 s_1 \\ W_2 s_2 \\ W_3 s_3 \\ W_4 s_4 \end{bmatrix}.$$

This can be applied to the xT-yR case, where x=y, and wherein x is the number of transmit SRS ports in one OFDM symbol on the network node side, and y is the total number of receiving antennas on the wireless device (e.g., UE) side.

Method 2. In this scenario, Y SRS ports correspond to L layers such that each layer is transmitted by Y SRS ports, and each of the Y SRS ports corresponds to L layers. Herein, the signal model used is:

$$\begin{bmatrix} j_1 \\ j_2 \\ \vdots \\ j_8 \end{bmatrix} = J = \begin{bmatrix} W_1 & W_2 & W_3 & W_4 \end{bmatrix} \begin{bmatrix} s_1 \\ s_2 \\ s_3 \\ s_4 \end{bmatrix}.$$

This can be applied to the xT-yR case, where x may be less than y. In the above mode, $s_i$ for i=1, 2, 3, 4 corresponds to the i-th layer, i-th beamformed SRS port, i-th beam.

In some embodiments, for each beamformed SRS port $s_i$, the transmission may be repeated y/x times. In an example, x=2, y=8, L=4, where the L layers are repeatedly transmitted 4 times, and are transmitted by each of the 8 antenna ports on the UE side. The L layers are repeatedly transmitted by each of the y antenna ports at the UE side. Each of the y antenna ports corresponds to the L layers at the UE side. For each of the y/x transmission times, the L layers are repeatedly transmitted at y/x transmission times, each of which corresponds to one subset of y antenna ports on the UE side. The UE transmits the L layers using x antenna ports on each transmission occasion. In another example, at different transmission times, the L layers are transmitted by different x antenna ports on the UE side. In yet another example, one SRS resource is configured by y/x transmission occasions, and different transmission occasions correspond to different x antenna ports on the UE side, with each of the y/x transmission occasions corresponding to L layers, L beams, or L SRS ports.

Alternatively, in yet another example, one SRS resource set is configured with y/x SRS resources, with different SRS resources of the y/x SRS resources corresponding to different x antenna ports at the UE side. Each of the y/x SRS resources corresponds to L layers, L beams, or L SRS ports. Each SRS resource includes x SRS ports or x antenna ports at the UE side. The x antenna ports at the UE side correspond to L reference signal port that can be indicated by L layers, L beams or L SRS ports. In these examples, x, y and L are integers with L being equal to or smaller than y, x being smaller than y, and/or x being equal to or smaller than y. y antenna ports at UE side corresponds to y repeatedly transmission of the L layers, L beams, or L SRS ports.

For different transmission occasions of the y/x transmission occasions (or different SRS resources of the y/x SRS resources) correspond to the same L layers, but they can correspond to different references. For example, each of the y/x transmission occasions (or each of the y/x SRS resources) correspond to the same L layers and different reference signals. As shown in Table 1, reference signal {11, 21, 31, 41} corresponds to same layer 1. The gNB obtains the channel corresponding to layer 1 by adding the channel corresponding to reference signal {11, 21, 31, 41}. Reference signal {12, 22, 32, 42} corresponds to same layer 2. The gNB obtains the channel corresponding to layer 2 by adding the channel corresponding to reference signal {12, 22, 32, 42}, and so on.

In some embodiments, different transmission occasions of the y/x transmission occasions (or different SRS resources of the y/x SRS resources) correspond to the same L layers and the same reference signal. Here the same reference signal corresponds to same set of configuration parameters and different reference signals correspond to different sets of configuration parameters. Each of the y/x transmission occasions (or each of the y/x SRS resources) correspond to one of L layers, L beams, or L SRS ports. Each of the L layers, L beams, or L SRS ports can correspond to the same power control factor, or different power control factors. If they correspond to different power control factors, the gNB may inform the relative power rate between different layers, beams, or SRS ports. Alternatively, the gNB may report the relative power rate between different layers, beams, or SRS ports to gNB.

TABLE 1

| Transmission occasion (or SRS resource) | Antenna ports at UE side | Layer | Reference signal |
|---|---|---|---|
| 1 | 1, 2 | 1, 2, 3, 4 | 11, 12, 13, 14 |
| 2 | 3, 4 | 1, 2, 3, 4 | 21, 22, 23, 24 |
| 3 | 5, 6 | 1, 2, 3, 4 | 31, 32, 33, 34 |
| 4 | 7, 8 | 1, 2, 3, 4 | 31, 32, 33, 34 |

In some embodiments, the precoding matrix $W_i$ is based on multiple channel state information (CSI)-reference signal (RS) resources from multiple coherent joint transmission (CJT) transmission-reception points (TRPs). In an example, the respective elements, $w_i$ for a precoding vector $\{w_0, w_1, \ldots, w_i, \ldots\}$ for each SRS port are provided for the same port ID by an SRS resource with ID i for antenna switching in an order. Herein, precoding is determined according to an associated CSI-RS for CJT.

In some embodiments, determining whether $W_i$ is subband or wideband is based on the physical resource block group (PRG) size of the SRS that is informed to the UE and/or reported to the network node, e.g., gNB.

In some embodiments, and if more than one SRS set is used for antenna switching in the xT-yR case with x being less than y, then the more than one SRS set shares the same multiple CSI-RS resources when configuring a beam of an SRS port.

Example Methods and Implementations of the Disclosed Technology

FIG. 1 shows a flowchart of an example method 100 for wireless communication, in accordance with the disclosed technology. The method 100 includes, at operation 110, transmitting, by a wireless device to a network node, a sounding reference signal (SRS). In some embodiments, the sounding reference signal is determined by a first parameter and a cyclic shift parameter, and a value of the first parameter hops at a level of a first type of time unit and a value of the cyclic shift parameter hops at a level of a second type of time unit.

FIG. 2 shows a flowchart of an example method 200 for wireless communication, in accordance with the disclosed technology. The method 200 includes, at operation 210, receiving, by a network node from a wireless device, a sounding reference signal (SRS).

The method 200 includes, at operation 220, performing, based on the SRS, further communication with the wireless device. In some embodiments, the sounding reference signal is determined by a first parameter and a cyclic shift parameter, and a value of the first parameter hops at a level of a first type of time unit and a value of the cyclic shift parameter hops at a level of a second type of time unit.

Figure 3:
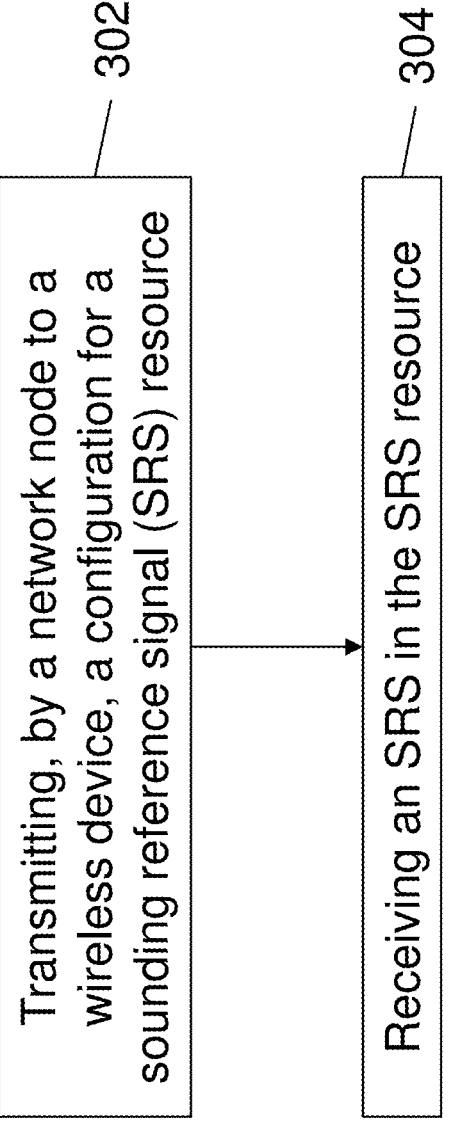

FIG. 3 shows a flowchart of an example method 300 for wireless communication, in accordance with the disclosed technology. The method 300 includes, at operation 310, transmitting, by a network node to a wireless device, a configuration for a sounding reference signal (SRS) resource.

The method 300 includes, at operation 320, receiving an SRS in the SRS resource. In some embodiments, the configuration comprises information associated with a time-domain orthogonal cover code (TD-OCC) or a multiplexing type for multiple SRS ports in the SRS resource.

Figure 4:
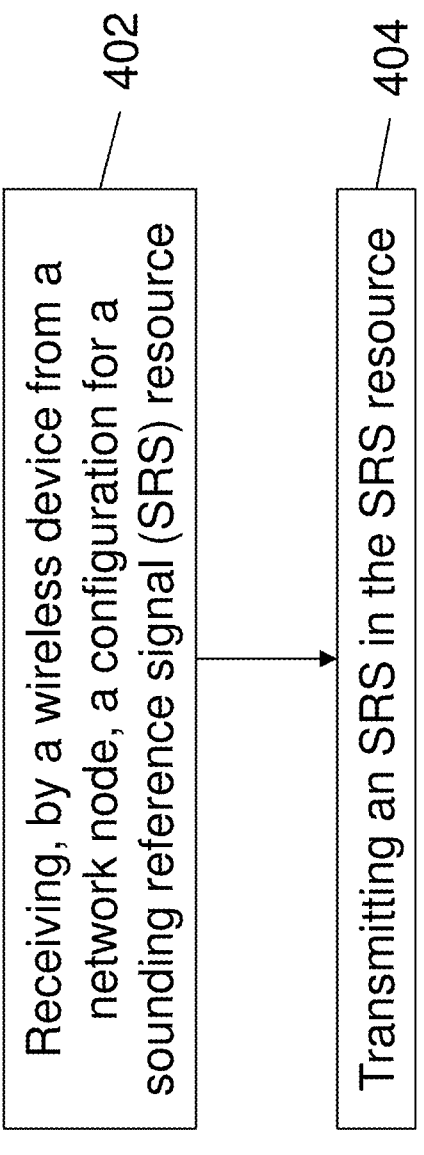

FIG. 4 shows a flowchart of an example method 400 for wireless communication, in accordance with the disclosed technology. The method 400 includes, at operation 410, receiving, by a wireless device from a network node, a configuration for a sounding reference signal (SRS) resource.

The method 400 includes, at operation 420, transmitting an SRS in the SRS resource. In some embodiments, the configuration comprises information associated with one or more time-domain orthogonal cover codes (TD-OCC) or a multiplexing type for multiple SRS ports in the SRS resource.

The disclosed technology provides, inter alia, the following technical solutions:

1. A method of wireless communication, comprising:
   transmitting, by a wireless device to a network node, a sounding reference signal (SRS), wherein the sounding reference signal is determined by a first parameter and a cyclic shift parameter, wherein a value of the first parameter hops at a level of a first type of time unit and a value of the cyclic shift parameter hops at a level of a second type of time unit.

2. A method of wireless communication, comprising:
   receiving, by a network node from a wireless device, a sounding reference signal (SRS); and
   performing, based on the SRS, further communication with the wireless device,
   wherein the sounding reference signal is determined by a first parameter and a cyclic shift parameter, wherein a value of the first parameter hops at a level of a first type of time unit and a value of the cyclic shift parameter hops at a level of a second type of time unit.

3. The method of solution 1 or 2, wherein the first type of time unit includes a first number of orthogonal frequency division multiplexing (OFDM) symbols, and the second type of time unit includes a second number of OFDM symbols.

4. The method of solution 1 or 2, wherein the first type of time unit or the second type of time unit is a time-domain unit associated with a frequency-domain hopping of the SRS.

5. The method of solution 1 or 2, wherein the first type of time unit or the second type of time unit is determined by a length of a time-domain orthogonal cover code (TD-OCC) of the SRS.

6. The method of solution 1 or 2, wherein the first type of time unit and the second type of time unit include a same number of OFDM symbols.

7. The method of solution 1 or 2, wherein the first type of time unit and the second type of time unit is a same type of time unit.

8. The method of any of solutions 1 to 7, wherein the value of the cyclic shift (CS) parameter for a first SRS is different from the value of the CS parameter for a second SRS in response to the value of the first parameter of the first SRS being equal to the value of the first parameter of the second SRS at a given time, or wherein the value of the first parameter for a first SRS is different from the value of the first parameter for a second SRS in response to the value of the CS parameter of the first SRS being equal to the value of the CS parameter of the second SRS at a given time.

9. The method of solution 8, wherein the first SRS is transmitted by a first wireless device and the second SRS is transmitted by a second wireless device.

10. The method of solution 8, wherein the first SRS and the second SRS are transmitted by the wireless device.

11. The method of any of solutions 1 to 7, wherein the value of the first parameter hops between two adjacent first type of time units, and wherein the value of the first parameter remains constant over one or more OFDM symbols within every first type of time unit.

12. The method of any of solutions 1 to 7, wherein the value of the cyclic shift parameter hops between two adjacent second type of time units, and wherein the value of the cyclic shift parameter remains constant over one or more OFDM symbols within every second type of time unit.

13. The method of any of solutions 1 to 7, wherein the value of the first parameter is based on a first index of the first type of time unit and the value of the cyclic shift parameter is based on a second index of the second type of time unit.

14. The method of any of solutions 1 to 7, wherein a hopping pattern for the first parameter is based on a first pseudo-random sequence generated by a first value of an initialization parameter ($c_{init}$), and wherein a hopping pattern for the CS parameter is based on a second pseudo-random sequence generated by a second value of the initialization parameter.

15. The method of solution 14, wherein the first value of the initialization parameter is determined as:

$$c_{init} = n_{ID}^{SRS}, \text{ or}$$

$$c_{init} = \lfloor n_{ID}^{SRS}/C \rfloor,$$

wherein $$n_{ID}^{SRS}$$

is an integer value configured for an SRS resource of the SRS, and wherein C is a total number of group numbers or a total number of candidate values of the first parameter.

16. The method of solution 15, wherein, in response to the first parameter including a group number of the SRS, the second value of the initialization parameter is determined as one of:

$$c_{init} = \lfloor (f_{gh} + n_{ID}^{SRS})/C \rfloor \bmod F;$$

$$c_{init} = (\lfloor f_{gh} + n_{ID}^{SRS} \rfloor/C + k) \bmod F;$$

$$c_{init} = (\lfloor f_{gh} + n_{ID}^{SRS} \rfloor/C + k(l)) \bmod F; \text{ or}$$

$$c_{init} = (\lfloor f_{gh} + n_{ID}^{SRS} \rfloor/C + k_0 + k(l)) \bmod F,$$

wherein $$n_{ID}^{SRS}$$

is a first integer value configured for an SRS resource of the SRS, C is a total number of the group numbers, F is an integer or a maximal number of candidate values of the CS parameter $$n_{SRS}^{cs,max},$$

$\Delta$ is an integer offset, $f_{gh}$ is an integer value which is relative to the hopping pattern for the first parameter, k and $k_0$ belong to $\{0, 1, \ldots, F-1\}$, and $k(l)$ belongs to $\{0, 1, \ldots, F-1\}$ and is determined by an OFDM symbol index $l=l_0+l'$.

17. The method of solution 15, wherein the second value of the initialization parameter is determined as one of:

$$c_{init} = \lfloor n_{ID}^{SRS}/C \rfloor \bmod F,$$

$$c_{init} = n_{ID,2}^{SRS},$$

$$c_{init} = n_{ID}^{SRS} + \Delta,$$

$$c_{init} = (\lfloor n_{ID}^{SRS}/C \rfloor + k(l)) \bmod F,$$

$$c_{init} = (\lfloor n_{ID}^{SRS}/C \rfloor + k) \bmod F, \text{ or}$$

$$c_{init} = (\lfloor n_{ID}^{SRS}/C \rfloor + k_0 + k(l)) \bmod F,$$

wherein $$n_{ID}^{SRS}$$

is a first integer value configured for an SRS resource of the SRS, $$n_{ID,2}^{SRS}$$

is a second integer value configured for the SRS resource of the SRS, C is a total number of group numbers or a total number of candidate values of the first parameter, F is an integer or a maximal number of candidate values of the CS parameter $$n_{SRS}^{cs,max},$$

$\Delta$ is an integer, $f_{gh}$ is an integer value that is relative to the hopping pattern for the first parameter, k and $k_0$ belong to {0, 1, . . . , F−1} and is configured by the network node, and k(1) belongs to {0, 1, . . . , F−1} and is determined by an OFDM symbol index $l=l_0+l'$ or is determined by an index of the second type of time unit.

18. The method of solution 17, wherein $\Delta$ is (i) based on a cell-radio network temporary identifier (C-RNTI) of the wireless device, (ii) configured by the network node, or (iii) configured by another network node.

19. The method of solution 17, wherein $\Delta$ is based on a physical cell index (PCI) associated with an SRS resource of the SRS.

20. The method of solution 17, wherein $\Delta$ is configured at one of the following levels: per wireless device, per cell, per physical cell index (PCI), or per SRS resource set that comprises one or more SRS resources.

21. The method of solution 14, wherein in case that the first parameter include a sequence number of the SRS, the second value of the initialization parameter is determined as one of:

$$c_{init} = \left(n_{ID}^{SRS} + v * P\right) \bmod F;$$

$$c_{init} = \left\lfloor n_{ID}^{SRS}/2 \right\rfloor \bmod F;$$

$$c_{init} = \left(n_{ID}^{SRS} + v\right) \bmod F; \text{ or}$$

$$c_{init} = \left(n_{ID}^{SRS} * (v + 1)\right) \bmod F,$$

wherein F and P are integers, v is the sequence number, and $$n_{ID}^{SRS}$$

is an integer configured for an SRS resource of the SRS.

22. The method of solution 21, wherein P is greater than or equal to a maximum available value of $$n_{ID}^{SRS}.$$

23. The method of any of solutions 1 to 7, wherein the first parameter is based on a first set of bits of a pseudo-random sequence generated by a value of an initialization parameter ($c_{init}$), wherein the CS parameter is based on a second set of bits of the pseudo-random sequence.

24. The method of solution 23, wherein a hopping pattern for the first parameter is determined by $f_{gh,or,v}$, wherein $f_{gh,or,v}$ is generated as one of:

$$f_{gh,or,v} = \left(\sum_{m=0}^{K-1} c\left((K+E)\left(n_{s,f}^{\mu}N_{symbol}^{slot} + l_0 + l'\right) + m\right)2^m\right) \bmod C;$$

-continued $$f_{gh,or,v} = \left(\sum_{m=0}^{K-1} c\left((K+E)\left(n_{s,f}^{\mu}N_{symbol}^{slot} + l_0 + l'\right) + m\right)2^m\right);$$

$$f_{gh,or,v} = \left(\sum_{m=0}^{K-1} c\left((K+E)\left(n_{s,f}^{\mu}N_{symbol}^{slot} + l_{firsttimeunit}\right) + m\right)2^m\right) \bmod C;$$

$$f_{gh,or,v} = \left(\sum_{m=0}^{K-1} c\left(K * \left(n_{s,f}^{\mu}N_{symbol}^{slot} + l_{firsttimeunit}\right) + m\right)2^m\right); \text{ or}$$

$$f_{gh,or,v} = \left(\sum_{m=0}^{K-1} c\left((K+E)\left(n_{s,f}^{\mu}N_{symbol}^{slot} + l_{firsttimeunit}\right) + m\right)2^m\right),$$

wherein a hopping pattern for the CS parameter is determined by $f_{cs}$, wherein $f_{cs}$ is generated as one of:

$$f_{cs} = \left(\sum_{m=0}^{E-1} c\left((K+E)\left(n_{s,f}^{\mu}N_{symbol}^{slot} + l_0 + l'\right) + K + m\right)2^m\right) \bmod F,$$

$$f_{cs} = \left(\sum_{m=0}^{E-1} c\left((K+E)\left(n_{s,f}^{\mu}N_{symbol}^{slot} + l_0 + l'\right) + K + m\right)2^m\right),$$

$$f_{cs} = \left(\sum_{m=0}^{E-1} c\left((K+E)\left(n_{s,f}^{\mu}N_{symbol}^{slot} + l_{secondtimeunit}\right) + K + m\right)2^m\right) \bmod F,$$

$$f_{cs} = \left(\sum_{m=0}^{E-1} c\left((K+E)\left(n_{s,f}^{\mu}N_{symbol}^{slot} + l_{secondtimeunit}\right) + K + m\right)2^m\right),$$

$$f_{cs} = \left(\sum_{m=0}^{E-1} c\left(E * \left(n_{s,f}^{\mu}N_{symbol}^{slot} + l_{secondtimeunit}\right) + m\right)2^m\right) \bmod F,$$

$$f_{cs} = \left(\sum_{m=0}^{E-1} c\left(E * \left(n_{s,f}^{\mu}N_{symbol}^{slot} + l_{secondtimeunit}\right) + m\right)2^m\right),$$

$$f_{cs} = \left(\sum_{m=0}^{E-1} c\left(E * \left(n_{s,f}^{\mu}N_{symbol}^{slot} + l_0 + l'\right) + m\right)2^m\right) \bmod F, \text{ or}$$

$$f_{cs} = \left(\sum_{m=0}^{E-1} c\left(E * \left(n_{s,f}^{\mu}N_{symbol}^{slot} + l_0 + l'\right) + m\right)2^m\right),$$

wherein K, E and F are integers, C is a total number of groups, $$n_{s,f}^{\mu}$$

is an index of a slot comprising the SRS and corresponding to a sub-carrier frequency of $15 \times 2^{\mu}$ kHz, $$N_{symbol}^{slot}$$

is a number of OFDM symbols in the slot, and
wherein, in response to one time unit including one OFDM symbol, $l_0$ is an index of a starting OFDM symbol comprising the SRS in the slot, and l' is a relative index of an SRS OFDM symbol that is relative to the starting OFDM symbol comprising the SRS in the slot,
wherein, in response to the one time unit including more than one OFDM symbol, $l_0$ is an index of a starting OFDM symbol comprising the SRS in the slot, l' is a relative index of an SRS OFDM symbol that is relative to the starting OFDM symbol except for the case of OFDM symbols in one time unit in which case l' is a relative index of an first SRS OFDM symbol in the one time unit, and wherein for $f_{gh,or,v}$, the one time unit is one of the first type of time unit and for $f_{cs}$, the one time unit is one of the second type of time unit, $l_{firsttimeunit}$ is an index of the first type of time unit that includes the SRS, and $l_{secondtimeunit}$ is an index of the second type of time unit that includes the SRS.

25. The method of solution 23, wherein a hopping pattern for the first parameter is determined by $f_{gh,or,v}$, wherein $f_{gh,or,v}$ is generated as one of:

$$f_{gh,or,v} = \left( \sum_{m=0}^{K-1} c\left((K+E)\left(n_{s,f}^{\mu} N_{symbol}^{slot} + l_0 + l'\right) + E + m\right)2^m \right) \bmod C,$$

$$f_{gh,or,v} = \sum_{m=0}^{K-1} c\left((K+E)\left(n_{s,f}^{\mu} N_{symbol}^{slot} + l_0 + l'\right) + E + m\right)2^m,$$

$$f_{gh,or,v} = \left( \sum_{m=0}^{K-1} c\left((K+E)\left(n_{s,f}^{\mu} N_{symbol}^{slot} + l_{firsttimeunit}\right) + E + m\right)2^m \right) \bmod C, \text{ or}$$

$$f_{gh,or,v} = \sum_{m=0}^{K-1} c\left((K+E)\left(n_{s,f}^{\mu} N_{symbol}^{slot} + l_{firsttimeunit}\right) + E + m\right)2^m,$$

wherein a hopping pattern for the CS parameter is determined by $f_{cs}$, wherein $f_{cs}$ is generated as one of:

$$f_{cs} = \left( \sum_{m=0}^{E-1} c\left((K+E)\left(n_{s,f}^{\mu} N_{symbol}^{slot} + l_0 + l'\right) + m\right)2^m \right) \bmod F,$$

$$f_{cs} = \left( \sum_{m=0}^{E-1} c\left((K+E)\left(n_{s,f}^{\mu} N_{symbol}^{slot} + l_0 + l'\right) + m\right)2^m \right),$$

$$f_{cs} = \left( \sum_{m=0}^{E-1} c\left((K+E)\left(n_{s,f}^{\mu} N_{symbol}^{slot} + l_{secondtimeunit}\right) + m\right)2^m \right) \bmod F, \text{ or}$$

$$f_{cs} = \left( \sum_{m=0}^{E-1} c\left((K+E)\left(n_{s,f}^{\mu} N_{symbol}^{slot} + l_{secondtimeunit}\right) + m\right)2^m \right), \text{ and}$$

wherein K, E and F are integers, C is a total number of groups, $$n_{s,f}^{\mu}$$

is an index of a slot comprising the SRS and corresponding to a sub-carrier frequency of $15 \times 2^{\mu}$ kHz, $$N_{symbol}^{slot}$$

is a number of OFDM symbols in the slot, in the case that one second type of time unit includes one OFDM symbol, wherein, in response to one time unit including one OFDM symbol, $l_0$ is an index of a starting OFDM symbol comprising the SRS in the slot, and l' is a relative index of an SRS OFDM symbol that is relative to the starting OFDM symbol comprising the SRS in the slot, wherein, in response to the one time unit including more than one OFDM symbol, $l_0$ is an index of a starting OFDM symbol comprising the SRS in the slot, l' is a relative index of an SRS OFDM symbol that is relative to the starting OFDM symbol except for the case of OFDMs in one time unit in which case l' is a relative index of an first SRS OFDM symbol in the one time unit, and wherein for $f_{gh,or,v}$, the one time unit is one of the first type of time unit and for $f_{cs}$, the one time unit is one of the second type of time unit, $l_{firsttimeunit}$ is an index of the first type of time unit that includes the SRS, and $l_{secondtimeunit}$ is an index of the second type of time unit that includes the SRS.

26. The method of solution 24 or 25, wherein an integer K is greater than or equal to $\lceil \log_2(B) \rceil$, and wherein B is the total number of the first parameter or B equals to C.

27. The method of solution 26, wherein K is equal to 8 in response to the first parameter being a group number of the SRS and C being equal to 30.

28. The method of solution 26, wherein K is equal to 1 in response to the first parameter being a sequence number of the SRS and C being equal to 1.

29. The method of solution 24 or 25, wherein (i) E is determined by F or (ii) E is larger than $\lceil \log_2(F) \rceil$.

30. The method of any of solutions 1 to 7, wherein the CS parameter is based on the first parameter.

31. The method of any of solutions 1 to 7, wherein the first parameter is based on the CS parameter.

32. The method of solution 30 or 31, wherein a hopping pattern of the CS parameter is based on a hopping pattern for the first parameter.

33. The method of solution 30 or 31, wherein a hopping pattern of the first parameter is based on a hopping pattern for the CS parameter.

34. The method of solution 30 or 31, wherein the CS parameter in the second type of time unit with a second index is based on the first parameter in the first type of time unit with a first index, or for the SRS on a OFDM symbol, the CS parameter of the OFDM symbol is based on the first parameter in the first type of time unit with a first index.

35. The method of solution 30 or 31, wherein in response to the first parameter including a group number of the SRS, the CS parameter of the SRS $$(n_{SRS}^{cs})$$

is determined as one of:

$$n_{SRS}^{cs} = \left\lfloor \left( f_{gh} + n_{ID}^{SRS} \right)/C \right\rfloor \bmod F;$$

$$n_{SRS}^{cs} = \left( \left\lfloor f_{gh} + n_{ID}^{SRS} \right\rfloor / C + k \right) \bmod F;$$

$$n_{SRS}^{cs} = \left( \left\lfloor f_{gh} + n_{ID}^{SRS} \right\rfloor / C + k(l) \right) \bmod F; \text{ or}$$

$$n_{SRS}^{cs} = \left( \left\lfloor f_{gh} + n_{ID}^{SRS} \right\rfloor / C + k_0 + k(l) \right) \bmod F,$$

wherein $$n_{ID}^{SRS}$$

is an integer configured for an SRS resource of the SRS, $f_{gh}$ is an integer hops at a level of the first type of time domain unit for the group number of the SRS, C is a total number of groups, and F is an integer, k and $k_0$ belong to $\{0, 1, \ldots, F-1\}$ and is configured by the network node, and $k(1)$ belongs to $\{0, 1, \ldots, F-1\}$ and is determined by an OFDM symbol index $l=l_0+l'$ or is determined by an index of the second time unit.

36. The method of solution 30 or 31, wherein in response to the first parameter including a sequence number of the SRS, an index of the CS parameter of the SRS $$(n_{SRS}^{cs})$$

is determined as one of:

$$n_{SRS}^{cs} = \left(n_{ID}^{SRS} + v * P\right) \bmod F;$$

$$n_{SRS}^{cs} = \left\lfloor n_{ID}^{SRS}/2 \right\rfloor \bmod F;$$

$$n_{SRS}^{cs} = \left(n_{ID}^{SRS} + v\right) \bmod F; \text{ or}$$

$$n_{SRS}^{cs} = \left(n_{ID}^{SRS} * (v+1)\right) \bmod F,$$

wherein P is an integer, v is the sequence number, $$n_{ID}^{SRS}$$

is an integer configured for an SRS resource of the SRS, $$n_{SRS}^{cs,max}$$

is a maximum number of cyclic shifts in one comb, and F is integer or a total number of candidate values $$n_{SRS}^{cs,max}$$

of the CS parameter.

37. The method of solution 30 or 31, wherein the CS parameter is determined by $f_{cs}$, wherein $f_{cs}$ is determined by one of:

$$f_{cs} = \left(\sum\nolimits_{m=0}^{E-1} c\left(E\left(n_{s,f}^{\mu} N_{symbol}^{slot} + l_0 + l'\right) + m\right) 2^m\right) \bmod F,$$

$$f_{cs} = \sum\nolimits_{m=0}^{E-1} c\left(E\left(n_{s,f}^{\mu} N_{symbol}^{slot} + l_0 + l'\right) + m\right) 2^m,$$

$$f_{cs} = \left(\sum_{m=0}^{E-1} c\left(E\left(n_{s,f}^{\mu} N_{symbol}^{slot} + l_{secondtimeuni}\right) + m\right) 2^m\right) \bmod F, \text{ or}$$

$$f_{cs} = \sum_{m=0}^{E-1} c\left(E\left(n_{s,f}^{\mu} N_{symbol}^{slot} + l_{secondtimeuni}\right) + m\right) 2^m,$$

and wherein E is an integer, $$n_{s,f}^{\mu}$$

is an index of a slot comprising the SRS and corresponding to a sub-carrier frequency of $15 \times 2^{\mu}$ kHz, $$N_{symbol}^{slot}$$

is a number of OFDM symbols in the slot, in the case that one second type of time unit includes one OFDM symbol, and $c(x)$ is an $x^{th}$ bit of a pseudo-random sequence, wherein, in response to one of the second type of time unit including one OFDM symbol, $l_0$ is an index of a starting OFDM symbol comprising the SRS in the slot, and $l'$ is a relative index of an SRS OFDM symbol that is relative to the starting OFDM symbol comprising the SRS in the slot, wherein, in response to one of the second type of time unit including more than one OFDM symbol, $l_0$ is an index of a starting OFDM symbol comprising the SRS in the slot, $l'$ is a relative index of an SRS OFDM symbol that is relative to the starting OFDM symbol except for the case of OFDMs in one time unit in which case $l'$ is a relative index of a first SRS OFDM symbol in the one time unit and wherein $l_{secondtimeunit}$ is an index of the second type of time unit including the SRS.

38. The method of solution 30 or 37, wherein the CS parameter is determined by $$n_{SRS}^{cs}, \text{ wherein } n_{SRS}^{cs}$$

is determined by one of:

$$n_{SRS}^{cs} = \left(f_{cs} + n_{ID,2}^{SRS}\right) \bmod F,$$

$$n_{SRS}^{cs} = \left(f_{cs} + n_{ID}^{SRS} + \Delta\right) \bmod F,$$

$$n_{SRS}^{cs} = f_{cs}, \text{ or}$$

$$n_{SRS}^{cs} = \left(f_{cs} + n_{ID}^{SRS}\right) \bmod F,$$

39. The method of any of solutions 1 to 38, wherein for one SRS resource with $$N_{ap}^{SRS}$$

SRS ports including the SRS, the cyclic shift $\alpha_i$ for antenna port $$p_i \in \{1000, 1000+1, \ldots, 1000+N_{ap}^{SRS}-1\}$$

is given as $$\alpha_i = 2\pi \frac{n_{SRS}^{cs,i}}{n_{SRS}^{cs,max}}$$

$$n_{SRS}^{cs,i} = \begin{cases} n_{SRS}^{cs} + \dfrac{n_{SRS}^{cs,max}\left\lfloor (p_i - 1000)/2\right\rfloor}{N_{ap}^{SRS}} \bmod F, & \text{if } N_{ap}^{SRS} = 4 \text{ and } n_{SRS}^{cs,max} = 6 \\ \\ n_{SRS}^{cs} + \dfrac{n_{SRS}^{cs,max}\left\lfloor p_i - 1000\right\rfloor}{N_{ap}^{SRS}} \bmod F \end{cases}, \text{ or}$$

-continued $$n_{SRS}^{cs,i} =$$

$$\begin{cases} \Delta_{cs} + n_{SRS}^{cs} + \dfrac{n_{SRS}^{cs,max} \lfloor (p_i - 1000)/2 \rfloor}{N_{ap}^{SRS}} \bmod F, & \text{if } N_{ap}^{SRS} = 4 \text{ and } n_{SRS}^{cs,max} = 6 \\ \Delta_{cs} + n_{SRS}^{cs} + \dfrac{n_{SRS}^{cs,max} \lfloor p_i - 1000 \rfloor}{N_{ap}^{SRS}} \bmod F \end{cases}$$

wherein $\Delta_{cs} \in \{0, 1, \ldots, F-1\}$ is configured by the network node.

40. The method of any solutions 1 to 39, wherein the wireless device is configured to receive signaling which includes selection information among modes, wherein the modes include at least two of: only group number hopping at a level of the first type of time unit, only sequence hopping at the level of the first type of time unit, group number hopping at the level of the first type of time unit and CS parameter hopping at a level of the second type of time unit, sequence number hopping at the level of the first type of time unit and the CS parameter hopping at the level of the second type of time unit, or the group number, the sequence number, and the CS parameter remaining constant across time units.

41. The method of any of solutions 1 to 40, wherein the first parameter includes a sequence number v or a group number.

42. A method of wireless communication, comprising:
    transmitting, by a network node to a wireless device, a configuration for a sounding reference signal (SRS) resource; and
    receiving an SRS in the SRS resource,
    wherein the configuration comprises information associated with a time-domain orthogonal cover code (TD-OCC) or a multiplexing type for multiple SRS ports in the SRS resource.

43. A method of wireless communication, comprising:
    receiving, by a wireless device from a network node, a configuration for a sounding reference signal (SRS) resource; and
    transmitting an SRS in the SRS resource,
    wherein the configuration comprises information associated with one or more time-domain orthogonal cover codes (TD-OCC) or a multiplexing type for multiple SRS ports in the SRS resource.

44. The method of solution 42 or 43, wherein a length of the TD-OCC is signaled by the network node to the wireless device.

45. The method of solution 42 or 43, wherein a length of the TD-OCC is equal to a repetition factor, and wherein the SRS in the SRS resource is on a same frequency resource on all OFDM symbols whose quantity is the repetition factor.

46. The method of solution 42 or 43, wherein a repetition factor is equal to a multiple of a length of the TD-OCC, and wherein the SRS in the SRS resource is on a same frequency resource on all OFDM symbols whose quantity is the repetition factor.

47. The method of solution 42 or 43, wherein, in response to the SRS resource being dropped on one or more OFDM symbols, at least one of a length of the TD-OCC, the TD-OCC, or the multiplexing type is determined by a number of remaining OFDM symbols that exclude dropped OFDM symbols.

48. The method of solution 42 or 43, wherein a sequence parameter of a hopping pattern of the SRS at a level of a time unit is independent of a length of the TD-OCC in response to more than one TD-OCC being used for SRS ports for the SRS resource, and wherein the sequence parameter comprises a group number of the SRS, a sequence number of the SRS, or a CS parameter of the SRS.

49. The method of solution 42 or 43, wherein a time unit of a hopping pattern of a sequence parameter of the SRS is greater than or equal to a length of the TD-OCC in response to (i) more than one TD-OCC being used for SRS ports on different SRS resources which include the SRS resource or (ii) only one TD-OCC being used for SRS ports in the SRS resource.

50. The method of solution 42 or 43, wherein a time unit of a hopping pattern of a sequence parameter of the SRS is independent of the TD-OCCs in response to a length of the TD-OCC being less than or equal to a number of SRS ports multiplexed by different TD-OCCs in the SRS resource.

51. The method of solution 42 or 43, wherein a time unit of a hopping pattern of a sequence parameter of the SRS is greater than or equal to a length of the TD-OCCs in response to a length of the TD-OCC being greater than a number of SRS ports multiplexed by different TD-OCC in the SRS resource.

52. The method of any of solutions 48 to 51, wherein the time unit of the hopping pattern of the sequence parameter of the SRS is determined by a signaling from the network node to the wireless device, and wherein the signaling comprises at least one of radio resource control (RRC) signaling, medium access control (MAC)-control element (CE) signaling, or downlink control information (DCI).

53. The method of solution 52, wherein the signaling includes (i) information associated with whether the time unit of the hopping pattern of the sequence parameter of the SRS is determined by the length of the TD-OCC or (ii) a number of OFDM symbols included in the time unit.

54. The method of solution 52, wherein the time unit comprises one OFDM symbol or more than one OFDM symbol such that a number of the more than one OFDM symbol is the length of the TD-OCCs.

55. The method of any of solutions 48 to 51, wherein the hopping pattern of the sequence parameter of the SRS is based on an integer of the SRS resource $$(n_{ID}^{SRS}),$$

and wherein the integer is indicated by downlink control information (DCI).

56. The method of solution 55, wherein the DCI indicates an absolute value of the integer using ten or more bits.

57. The method of solution 55, wherein the DCI indicates a relative index of the integer in a list of candidate values of the integer using fewer than ten bits.

58. The method of solution 42 or 43, wherein the multiplexing type for the multiple SRS ports includes at least one of (i) the multiple SRS ports being multiplexed by using different cyclic shift (CS) parameters, the multiple SRS ports being multiplexed by using different TD-OCCs, or the multiple SRS ports being multiplexed by using different combs.

59. The method of solution 42 or 43, wherein determining a cyclic shift (CS) parameter of an SRS port in the SRS resource, a TD-OCC parameter of the SRS port in the SRS resource, or a comb parameter of the SRS port in the SRS resource is based on at least one of the other two parameters.

60. The method of solution 59, wherein the cyclic shift parameter $$\left(n_{SRS}^{cs,i}\right)$$

for an i-th SRS port in the SRS resource is determined as:

$$n_{SRS}^{cs,i} = n_{SRS}^{cs} + \frac{n_{SRS}^{cs,max}\left\lfloor (p_j - 1000)/N_{ap,oneTD-OCC\ and\ oneComb}^{SRS}\right\rfloor}{N_{ap,oneTD-OCC\ and\ oneComb}^{SRS}}\bmod F \ \text{or}$$

$$n_{SRS}^{cs,i} =$$

$$\left\{ \begin{array}{l} n_{SRS}^{cs} + \dfrac{n_{SRS}^{cs,max}\left\lfloor (p_i - 1000)/2\right\rfloor}{N_{ap,oneTD-OCC}^{SRS}}\bmod F, \ \text{if } N_{ap}^{SRS} = 4 \ \text{and } n_{SRS}^{cs,max} = 6 \\ n_{SRS}^{cs} + \dfrac{n_{SRS}^{cs,max}\left\lfloor p_i - 1000\right\rfloor}{N_{ap,TD-OCC}^{SRS}}\bmod F \end{array} \right. ,$$

and wherein F is an integer or $$n_{SRS}^{cs,max}, \ n_{SRS}^{cs}$$

is an index of the CS parameter of the SRS, $$N_{SRS}^{cs,max}$$

is a maximum number of cyclic shifts in one comb, $$N_{ap}^{SRS}$$

is a number of antenna ports of the wireless device, $p_i$ is an i-th antenna port, $$N_{ap,oneTD-OCC}^{SRS}$$

is a number of SRS ports corresponding to one TD-OCC index in the SRS resource, and $$N_{ap,oneTD-OCC,oneComb}^{SRS}$$

is a number of SRS ports with a same TD-OCC index in a same comb in the SRS resource.

61. The method of solution 59, wherein the comb parameter $$\left(k_{TC}^{(p_i)}\right)$$

for an i-th SRS port ($p_i$) in the SRS resource is determined as:

$$k_{TC}^{(p_i)} = \left\{ \begin{array}{ll} (\bar{k}_{TC} + K_{TC}/2)\bmod K_{TC} & \text{if } N_{ap,oneTD-OCC}^{SRS} = 4, \ p_i \in \{1001, 1003\}, \text{and } F = 6 \\ (\bar{k}_{TC} + K_{TC}/2)\bmod K_{TC} & \text{if } N_{ap,oneTD-OCC}^{SRS} = 4, \ p_i \in \{1001, 1003\}, \text{and } n_{SRS}^{cs} \in \{F/2, \ldots, F-1\}, \\ \bar{k}_{TC}, & \text{otherwise} \end{array} \right.$$

wherein $$N_{ap,oneTD-OCC}^{SRS}$$

is a number of SRS ports corresponding to one TD-OCC index, $$n_{SRS}^{cs}$$

is an index of the CS parameter of the SRS, $K_{TC}$ is a transmission comb number, and $\bar{k}_{TC}$ is a comb offset.

62. The method of solution 42 or 43, wherein, in response to the SRS resource overlapping with another signal or another channel on M of N OFDM symbols of the SRS resource, the SRS resource is dropped on the N OFDM symbols or the M OFDM symbols based on at least one of whether there is a TD-OCC of length M1 corresponding to a TD-OCC of length N1 of the SRS, or an index of the TD-OCC of the SRS, wherein M is less than N, M1 is less than M, N1 is less than N, wherein M, N, N1 and M1 are integers, and wherein M is multiple of M1 and N is multiple of N1.

63. An apparatus for wireless communication comprising a processor, configured to implement a method recited in one or more of solutions 1 to 62.

64. A non-transitory computer readable program storage medium having code stored thereon, the code, when executed by a processor, causing the processor to implement a method recited in one or more of solutions 1 to 62.

Figure 5:
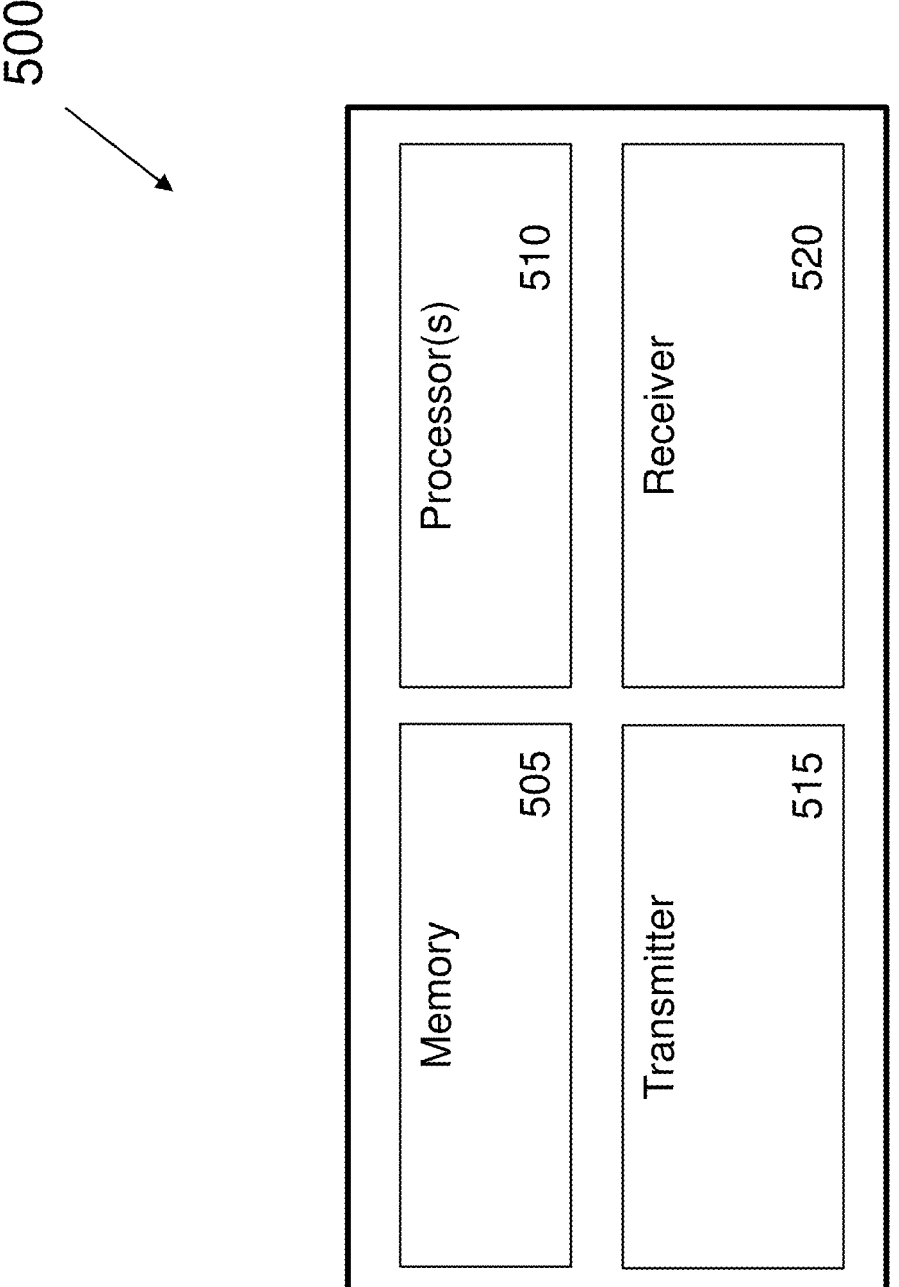
FIG. 5 shows an exemplary block diagram of a hardware platform that may be a part of a network device or a communication device.

FIG. 5 shows an exemplary block diagram of a hardware platform 500 that may be a part of a network device (e.g., base station) or a communication device (e.g., a user equipment (UE)). The hardware platform 500 includes at least one processor 510 and a memory 505 having instructions stored thereupon. The instructions upon execution by the processor 510 configure the hardware platform 500 to perform the operations described in FIGS. 1 to 4 and in the various embodiments described in this patent document. The transmitter 515 transmits or sends information or data to another device. For example, a network device transmitter can send a message to a user equipment. The receiver 520 receives information or data transmitted or sent by another device. For example, a user equipment can receive a message from a network device.

Figure 6:
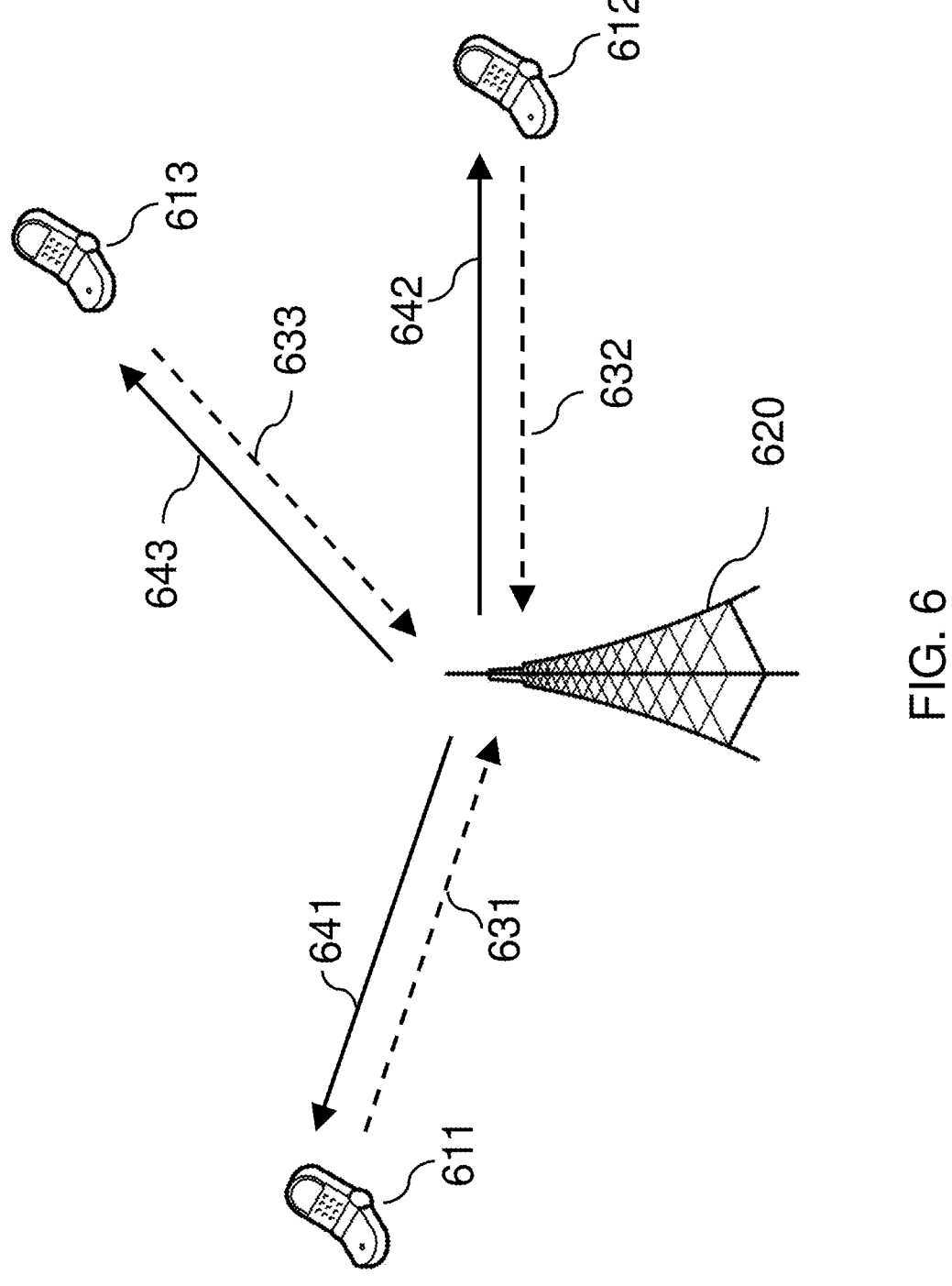
FIG. 6 shows an example of wireless communication including a base station (BS) and user equipment (UE) based on some implementations of the disclosed technology.

The implementations as discussed above will apply to a wireless communication. FIG. 6 shows an example of a wireless communication system (e.g., a 5G or NR cellular network) that includes a base station 620 and one or more user equipment (UE) 611, 612 and 613. In some embodiments, the UEs access the BS (e.g., the network) using a communication link to the network (sometimes called uplink direction, as depicted by dashed arrows 631, 632, 633), which then enables subsequent communication (e.g., shown in the direction from the network to the UEs, sometimes called downlink direction, shown by arrows 641, 642, 643) from the BS to the UEs. In some embodiments, the BS send information to the UEs (sometimes called downlink direction, as depicted by arrows 641, 642, 643), which then enables subsequent communication (e.g., shown in the direction from the UEs to the BS, sometimes called uplink direction, shown by dashed arrows 631, 632, 633) from the UEs to the BS. The UE may be, for example, a smartphone, a tablet, a mobile computer, a machine to machine (M2M) device, an Internet of Things (IoT) device, and so on.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:
transmitting, by a wireless device to a network node, a sounding reference signal (SRS),
wherein the sounding reference signal is determined by a first parameter and a cyclic shift (CS) parameter,
wherein a value of the first parameter hops at a level of a first type of time unit and a value of the cyclic shift parameter hops at a level of a second type of time unit,
wherein the first parameter includes a sequence number v or a group number,
wherein a hopping pattern for the first parameter is based on a first pseudo-random sequence generated by a first value of an initialization parameter ($c_{init}$), and wherein a hopping pattern for the CS parameter is based on a second pseudo-random sequence generated by a second value of the initialization parameter,
wherein the first value of the initialization parameter is determined as:

$$c_{init} = n_{ID}^{SRS},$$

wherein $$n_{ID}^{SRS}$$

is an integer value configured for an SRS resource of the SRS,
wherein the second value of the initialization parameter is determined as:

$$c_{init} = n_{ID,2}^{SRS}, \text{ and}$$

wherein $$n_{ID,2}^{SRS}$$

is a second integer value configured for the SRS resource of the SRS.

2. The method of claim 1, wherein the first type of time unit or the second type of time unit is determined by a length of a time-domain orthogonal cover code (TD-OCC) of the SRS.

3. The method of claim 1, wherein the first type of time unit and the second type of time unit include a same number of OFDM symbols, and wherein the first type of time unit and the second type of time unit is a same type of time unit.

4. The method of claim 1, wherein for one SRS resource with $$N_{ap}^{SRS}$$

SRS ports including the SRS, a cyclic shift $\alpha_i$ for antenna port $$p_i \in \{1000, 1000 + 1, \dots, 1000 + N_{ap}^{SRS} - 1\}$$

is given as $$\alpha_i = 2\pi \frac{n_{SRS}^{cs,i}}{n_{SRS}^{cs,max}}$$

$$n_{SRS}^{cs,i} = \begin{cases} \Delta_{cs} + n_{SRS}^{cs} + \dfrac{n_{SRS}^{cs,max}\lfloor (p_i - 1000)/2 \rfloor}{N_{ap}^{SRS}} \bmod F, & \text{if } N_{ap}^{SRS} = 4 \text{ and } n_{SRS}^{cs,max} = 6 \\[2ex] \Delta_{cs} + n_{SRS}^{cs} + \dfrac{n_{SRS}^{cs,max}\lfloor p_i - 1000 \rfloor}{N_{ap}^{SRS}} \bmod F \end{cases},$$

wherein $\Delta_{cs} \in \{0, 1, \dots, F-1\}$ is configured by the network node, wherein $$n_{SRS}^{cs} = f_{cs},$$

and wherein $f_{cs} = \left( \sum_{m=0}^{E-1} c\left(E\left(n_{s,f}^{\mu} N_{symbol}^{slot} + l_0 + l'\right) + m\right) 2^m \right) \bmod F.$ wherein $$n_{SRS}^{cs,max}$$

maximum number of cycle shifts in one comb, and wherein F is an integer or $$n_{SRS}^{cs,max}.$$

5. The method of claim 1, further comprising:
receiving, from the network node, a signaling which includes selection information among modes, wherein the modes include at least two of: only group number hopping at a level of the first type of time unit, only sequence hopping at the level of the first type of time unit, group number hopping at the level of the first type of time unit and CS parameter hopping at a level of the second type of time unit, sequence number hopping at the level of the first type of time unit and the CS parameter hopping at the level of the second type of time unit, or the group number, the sequence number, and the CS parameter remaining constant across time units.

6. The method of claim 1, further comprising:

receiving, by the wireless device from the network node, a configuration for the SRS resource, wherein the SRS is transmitted, by the wireless device, in the SRS resource, and wherein the configuration comprises information associated with one or more time-domain orthogonal cover codes (TD-OCC), and wherein a repetition factor is equal to a multiple of a length of the TD-OCC, and wherein the SRS in the SRS resource is on a same frequency resource on all OFDM symbols whose quantity is the repetition factor.

7. The method of claim 6, wherein determining a cyclic shift (CS) parameter of an SRS port in the SRS resource, a TD-OCC parameter of the SRS port in the SRS resource, or a comb parameter of the SRS port in the SRS resource is based on at least one of the other two parameters.

8. The method of claim 7, wherein the cyclic shift parameter $$\left(n_{SRS}^{cs,i}\right)$$

for an i-th SRS port in the SRS resource is determined as:

$$n_{SRS}^{cs,i} = n_{SRS}^{cs} + \frac{n_{SRS}^{cs,max}\lfloor (p_j - 1000)/N_{ap,oneTD-OCC\ and\ oneComb}^{SRS} \rfloor}{N_{ap,oneTD-OCC\ and\ oneComb}^{SRS}} \bmod F \text{ or}$$

$$n_{SRS}^{cs,i} =$$

$$\begin{cases} n_{SRS}^{cs} + \dfrac{n_{SRS}^{cs,max}\lfloor (p_i - 1000)/2 \rfloor}{N_{ap,oneTD-OCC}^{SRS}} \bmod F, & \text{if } N_{ap}^{SRS} = 4 \text{ and } n_{SRS}^{cs,max} = 6 \\[2ex] n_{SRS}^{cs} + \dfrac{n_{SRS}^{cs,max}\lfloor p_i - 1000 \rfloor}{N_{ap,TD-OCC}^{SRS}} \bmod F \end{cases},$$

and wherein F is an integer or $$n_{SRS}^{cs,max}, n_{SRS}^{cs}$$

5 is an index of the CS parameter of the SRS, $$n_{SRS}^{cs,max}$$

10 is a maximum number of cyclic shifts in one comb, $$N_{ap}^{SRS}$$

15 is a number of antenna ports of the wireless device, $p_i$ is an i-th antenna port,

20

$$N_{ap,oneTD-OCC}^{SRS}$$

25 is a number of SRS ports corresponding to one TD-OCC index in the SRS resource, and $$N_{ap,oneTD-OCC,oneComb}^{SRS}$$

30 is a number of SRS ports with a same TD-OCC index in a same comb in the SRS resource.

9. The method of claim 7, wherein the comb parameter $$\left(k_{TC}^{(p_i)}\right)$$

40 for an i-th SRS port ($p_i$) in the SRS resource is determined as:

$$k_{TC}^{(p_i)} = \begin{cases} \left(\bar{k}_{TC} + K_{TC}/2\right) \bmod K_{TC} & \text{if } N_{ap,oneTD-OCC}^{SRS} = 4, \quad p_i \in \{1001, 1003\}, \text{ and } F = 6 \\ \left(\bar{k}_{TC} + K_{TC}/2\right) \bmod K_{TC} & \text{if } N_{ap,oneTD-OCC}^{SRS} = 4, \quad p_i \in \{1001, 1003\}, \text{ and } n_{SRS}^{cs} \in \{F/2, \ldots, F-1\}, \\ \bar{k}_{TC}, & \text{otherwise} \end{cases}$$

50 wherein $$N_{ap,oneTD-OCC}^{SRS}$$

55 is a number of SRS ports corresponding to one TD-OCC index,

60

$$n_{SRS}^{cs}$$

65 is an index of the CS parameter of the SRS, $K_{TC}$ is a transmission comb number, and $\bar{k}_{TC}$ is a comb offset.

10. A method of wireless communication, comprising:

receiving, by a network node from a wireless device, a sounding reference signal (SRS); and performing, based on the SRS, further communication with the wireless device, wherein the sounding reference signal is determined by a first parameter and a cyclic shift (CS) parameter, wherein a value of the first parameter hops at a level of a first type of time unit and a value of the cyclic shift parameter hops at a level of a second type of time unit, wherein the first parameter includes a sequence number v or a group number, wherein a hopping pattern for the first parameter is based on a first pseudo-random sequence generated by a first value of an initialization parameter ($c_{init}$), and wherein a hopping pattern for the CS parameter is based on a second pseudo-random sequence generated by a second value of the initialization parameter, wherein the first value of the initialization parameter is determined as:

$$c_{init} = n_{ID}^{SRS},$$

wherein $$n_{ID}^{SRS}$$

is an integer value configured for an SRS resource of the SRS, wherein the second value of the initialization parameter is determined as:

$$c_{init} = n_{ID,2}^{SRS}, \text{ and}$$

wherein $$n_{ID,2}^{SRS}$$

is a second integer value configured for the SRS resource of the SRS.

11. The method of claim 10, wherein the first type of time unit or the second type of time unit is determined by a length of a time-domain orthogonal cover code (TD-OCC) of the SRS.

12. The method of claim 10, wherein the first type of time unit and the second type of time unit include a same number of OFDM symbols, and wherein the first type of time unit and the second type of time unit is a same type of time unit.

13. The method of claim 10, wherein for one SRS resource with $$N_{ap}^{SRS}$$

SRS ports including the SRS, a cyclic shift $\alpha_i$ for antenna port $$p_i \in \left\{1000, 1000+1, \ldots, 1000+N_{ap}^{SRS}-1\right\}$$

is given as $$\alpha_i = 2\pi \frac{n_{SRS}^{cs,i}}{n_{SRS}^{cs,max}},$$

$$n_{SRS}^{cs,i} =$$

$$\left\{\begin{array}{l} \Delta_{cs} + n_{SRS}^{cs} + \dfrac{n_{SRS}^{cs,max}\lfloor(p_i-1000)/2\rfloor}{N_{ap}^{SRS}}\bmod F, \text{ if } N_{ap}^{SRS}=4 \text{ and } n_{SRS}^{cs,max}=6 \\[2em] \Delta_{cs} + n_{SRS}^{cs} + \dfrac{n_{SRS}^{cs,max}\lfloor p_i-1000\rfloor}{N_{ap}^{SRS}}\bmod F \end{array}\right. ,$$

wherein $\Delta_{cs} \in \{0, 1, \ldots, F-1\}$ is configured by the network node, wherein $$n_{SRS}^{cs} = f_{cs},$$

and wherein $f_{cs} = \left(\sum_{m=0}^{E-1} c\big(E\big(n_{s,f}^{\mu}N_{symbol}^{slot}+l_0+l'\big)+m\big)2^m\right)\bmod F.$

14. The method of claim 10, further comprising:
transmitting, to the wireless device, a signaling which includes selection information among modes, wherein the modes include at least two of: only group number hopping at a level of the first type of time unit, only sequence hopping at the level of the first type of time unit, group number hopping at the level of the first type of time unit and CS parameter hopping at a level of the second type of time unit, sequence number hopping at the level of the first type of time unit and the CS parameter hopping at the level of the second type of time unit, or the group number, the sequence number, and the CS parameter remaining constant across time units.

15. The method of claim 10, further comprising:
transmitting, by the network node to the wireless device, a configuration for the sounding reference signal (SRS) resource,
wherein the SRS is received, by the network node, in the SRS resource,
wherein the configuration comprises information associated with a time-domain orthogonal cover code (TD-OCC), and wherein a repetition factor is equal to a multiple of a length of the TD-OCC, and wherein the SRS in the SRS resource is on a same frequency resource on all OFDM symbols whose quantity is the repetition factor.

16. The method of claim 15, wherein determining a cyclic shift (CS) parameter of an SRS port in the SRS resource, a TD-OCC parameter of the SRS port in the SRS resource, or a comb parameter of the SRS port in the SRS resource is based on at least one of the other two parameters.

17. The method of claim 16, wherein the cyclic shift parameter $$\left(n_{SRS}^{cs,i}\right)$$

for an i-th SRS port in the SRS resource is determined as:

$$n_{SRS}^{cs,i} = n_{SRS}^{cs} + \frac{n_{SRS}^{cs,max}\left\lfloor(p_j-1000)/N_{ap,oneTD-OCC \text{ and } oneComb}^{SRS}\right\rfloor}{N_{ap,oneTD-OCC \text{ and } oneComb}^{SRS}}\bmod F \text{ or}$$

$$n_{SRS}^{cs,i} =$$

$$\left\{\begin{array}{l} n_{SRS}^{cs} + \dfrac{n_{SRS}^{cs,max}\lfloor(p_i-1000)/2\rfloor}{N_{ap,oneTD-OCC}^{SRS}}\bmod F, \text{ if } N_{ap}^{SRS}=4 \text{ and } n_{SRS}^{cs,max}=6 \\[2em] n_{SRS}^{cs} + \dfrac{n_{SRS}^{cs,max}\lfloor p_i-1000\rfloor}{N_{ap,TD-OCC}^{SRS}}\bmod F \end{array}\right. ,$$

and
wherein F is an integer or $$n_{SRS}^{cs,max}, n_{SRS}^{cs}$$

is an index of the CS parameter of the SRS, $$n_{SRS}^{cs,max}$$

is a maximum number of cyclic shifts in one comb, $$N_{ap}^{SRS}$$

is a number of antenna ports of the wireless device, $p_i$ is an i-th antenna port, $$N_{ap,oneTD-OCC}^{SRS}$$

is a number of SRS ports corresponding to one TD-OCC index in the SRS resource, and $$N_{ap,oneTD-OCC,oneComb}^{SRS}$$

is a number of SRS ports with a same TD-OCC index in a same comb in the SRS resource.

18. The method of claim 16, wherein the comb parameter $$\left(k_{TC}^{(p_i)}\right)$$

for an i-th SRS port ($p_i$) in the SRS resource is determined as:

$$k_{TC}^{(p_i)} = \begin{cases} (\bar{k}_{TC} + K_{TC}/2) \bmod K_{TC} & \text{if } N_{ap,oneTD-OCC}^{SRS} = 4, \ p_i \in \{1001, 1003\}, \text{ and } F = 6 \\ (\bar{k}_{TC} + K_{TC}/2) \bmod K_{TC} & \text{if } N_{ap,oneTD-OCC}^{SRS} = 4, \ p_i \in \{1001, 1003\}, \text{ and } n_{SRS}^{cs} \in \{F/2, \ldots, F-1\}, \\ \bar{k}_{TC}, & \text{otherwise} \end{cases}$$

wherein $$N_{ap,oneTD-OCC}^{SRS}$$

is a number of SRS ports corresponding to one TD-OCC index, $$n_{SRS}^{cs}$$

is an index of the CS parameter of the SRS, $K_{TC}$ is a transmission comb number, and $\bar{k}_{TC}$ is a comb offset.

19. An apparatus for wireless communication, comprising:

one or more processors configured to:

transmit, by a wireless device to a network node, a sounding reference signal (SRS), wherein the sounding reference signal is determined by a first parameter and a cyclic shift (CS) parameter, wherein a value of the first parameter hops at a level of a first type of time unit and a value of the cyclic shift parameter hops at a level of a second type of time unit, wherein the first parameter includes a sequence number v or a group number, wherein a hopping pattern for the first parameter is based on a first pseudo-random sequence generated by a first value of an initialization parameter ($c_{init}$), and wherein a hopping pattern for the CS parameter is based on a second pseudo-random sequence generated by a second value of the initialization parameter, wherein the first value of the initialization parameter is determined as:

$$c_{init} = n_{ID}^{SRS},$$

wherein $$n_{ID}^{SRS}$$

is an integer value configured for an SRS resource of the SRS, wherein the second value of the initialization parameter is determined as:

$$c_{init} = n_{ID,2}^{SRS}, \text{ and}$$

wherein $$n_{ID,2}^{SRS}$$

is a second integer value configured for the SRS resource of the SRS.

20. An apparatus for wireless communication, comprising:

one or more processors configured to:

receive, by a network node from a wireless device, a sounding reference signal (SRS); and perform, based on the SRS, further communication with the wireless device, wherein the sounding reference signal is determined by a first parameter and a cyclic shift (CS) parameter, wherein a value of the first parameter hops at a level of a first type of time unit and a value of the cyclic shift parameter hops at a level of a second type of time unit, wherein the first parameter includes a sequence number v or a group number, wherein a hopping pattern for the first parameter is based on a first pseudo-random sequence generated by a first value of an initialization parameter ($c_{init}$), and wherein a hopping pattern for the CS parameter is based on a second pseudo-random sequence generated by a second value of the initialization parameter, wherein the first value of the initialization parameter is determined as:

$$c_{init} = n_{ID}^{SRS},$$

wherein $$n_{ID}^{SRS}$$

is an integer value configured for an SRS resource of the SRS, wherein the second value of the initialization parameter is determined as:

$$c_{init} = n_{ID,2}^{SRS}, \text{ and}$$

wherein $$n_{ID,2}^{SRS}$$

is a second integer value configured for the SRS resource of the SRS.

* * * * *